United States Patent
Kim et al.

(10) Patent No.: US 12,548,385 B2
(45) Date of Patent: Feb. 10, 2026

(54) AGRICULTURAL VEHICLE MANAGEMENT SYSTEM AND OPERATING METHOD THEREFOR

(71) Applicant: GINT CO., LTD., Suwon-si (KR)

(72) Inventors: Yonghyeon Kim, Suwon-si (KR); Seungrak Son, Suwon-si (KR); Jaeho Song, Yongin-si (KR)

(73) Assignee: GINT Co., Ltd., Suwon-si (KR)

( * ) Notice: Subject to any disclaimer, the term of this patent is extended or adjusted under 35 U.S.C. 154(b) by 197 days.

(21) Appl. No.: 18/251,137

(22) PCT Filed: Apr. 13, 2021

(86) PCT No.: PCT/KR2021/004663
§ 371 (c)(1),
(2) Date: Apr. 28, 2023

(87) PCT Pub. No.: WO2022/097852
PCT Pub. Date: May 12, 2022

(65) Prior Publication Data
US 2024/0001940 A1    Jan. 4, 2024

(30) Foreign Application Priority Data

Nov. 4, 2020 (KR) .......... 10-2020-0145688
Nov. 10, 2020 (KR) .......... 10-2020-0149728
(Continued)

(51) Int. Cl.
*G07C 5/00* (2006.01)
*B60W 50/02* (2012.01)
(Continued)

(52) U.S. Cl.
CPC ......... *G07C 5/008* (2013.01); *B60W 50/0205* (2013.01); *B60W 50/14* (2013.01);
(Continued)

(58) Field of Classification Search
CPC .. G07C 5/008; G07C 5/0833; B60W 50/0205; B60W 50/14; B60W 2050/021;
(Continued)

(56) References Cited

U.S. PATENT DOCUMENTS

| | | | | |
|---|---|---|---|---|
| 6,256,594 B1 * | 7/2001 | Yamamoto | ........... | G07C 5/0808 |
| | | | | 702/184 |
| 2016/0010313 A1 * | 1/2016 | Sugiura | ................ | G07C 5/0808 |
| | | | | 701/29.4 |

(Continued)

FOREIGN PATENT DOCUMENTS

| | | | |
|---|---|---|---|
| JP | 2002-181668 A | 6/2002 | |
| JP | 2003-027529 A | 1/2003 | |

(Continued)

OTHER PUBLICATIONS

International Search Report and Written Opinion mailed Jan. 4, 2022 in International Application No. PCT/KR2021/004663.

*Primary Examiner* — Isaac G Smith
(74) *Attorney, Agent, or Firm* — Sughrue Mion, PLLC

(57) ABSTRACT

Proposed is a system for obtaining information when an agricultural vehicle malfunctions. The system may include an agricultural vehicle in which a terminal including a processor and a communication module is mounted, and a server communicatively connected to the terminal. The processor of the terminal may generate a malfunction code when malfunction is detected through a sensor included in the agricultural vehicle. When the malfunction code is generated, the processor may operate in at least one of a first mode or a second mode. In the first mode, raw data obtained during the malfunction code being generated is transmitted to the server through the communication module. In the second mode, raw data obtained before the malfunction code is generated and raw data obtained after the malfunction (Continued)

code is generated are transmitted to the server through the communication module.

4 Claims, 21 Drawing Sheets

(30)  Foreign Application Priority Data

Nov. 10, 2020  (KR) .......................... 10-2020-0149729
Nov. 10, 2020  (KR) .......................... 10-2020-0149730

(51) Int. Cl.
  *B60W 50/14*    (2020.01)
  *G06Q 50/02*    (2012.01)
  *G07C 5/08*     (2006.01)
(52) U.S. Cl.
  CPC ........... *G06Q 50/02* (2013.01); *G07C 5/0833* (2013.01); *B60W 2050/021* (2013.01); *B60W 2050/143* (2013.01); *B60W 2300/152* (2013.01); *B60W 2556/45* (2020.02)
(58) Field of Classification Search
  CPC ..... B60W 2050/143; B60W 2300/152; B60W 2556/45; G06Q 50/02
  USPC ....................................................... 701/33.6
  See application file for complete search history.

(56)  References Cited

U.S. PATENT DOCUMENTS

2019/0156593 A1* 5/2019 Sasaki ................. H04L 63/1416
2022/0049453 A1* 2/2022 Izumi ..................... E02F 9/268

FOREIGN PATENT DOCUMENTS

| | | | | |
|---|---|---|---|---|
| JP | 2004139469 | A | * | 5/2004 |
| JP | 2007-100305 | A | | 4/2007 |
| JP | 2013-014992 | A | | 1/2013 |
| JP | 2013-016120 | A | | 1/2013 |
| JP | 2019-040635 | A | | 3/2019 |
| JP | 2019-214831 | A | | 12/2019 |
| JP | 2020-115108 | A | | 7/2020 |
| KR | 10-2001-0027872 | A | | 4/2001 |
| KR | 20090000264 | A | * | 1/2009 |
| KR | 10-2010-0118875 | A | | 11/2010 |
| KR | 10-2012-0050307 | A | | 5/2012 |
| KR | 10-2015-0108296 | A | | 9/2015 |
| KR | 10-2017-0045576 | A | | 4/2017 |
| KR | 10-2018-0068733 | A | | 6/2018 |
| KR | 10-2019-0079807 | A | | 7/2019 |
| KR | 10-2019-0118760 | A | | 10/2019 |
| KR | 10-2019-0120571 | A | | 10/2019 |
| KR | 10-2019-0122298 | A | | 10/2019 |
| KR | 10-2020-0120140 | A | | 10/2020 |

* cited by examiner

FIG. 3

| MODEL LIST | | | | | [+ MODEL REGISTRATION] | |
|---|---|---|---|---|---|---|
| MODEL NAME | HORSE-POWER ▲▼ | YEARS ▲▼ | FACTORY PRICE | GEAR ▲▼ | DETAILS |
| take@dfc | 160 PS | 2020 | 90 M won | Manual | |
| take 2@ | 151 PS | 2020 | 60 M won | Manual | |
| TEST-DAEDONG-PROFILE-01 | 150 PS | 2020 | 110 K won | PSS | |
| ... | ... | ... | ... | ... | |
| ... | ... | ... | ... | ... | |
| ... | ... | ... | ... | ... | |
| ... | ... | ... | ... | ... | |

1 2 3 ▲

MODEL NAME -take 2@

| DESCRIPTION | GEAR |
|---|---|
| | Manual |
| HORSEPOWER | SELLING PRICE |
| 151 PS | 110 K won |
| YEARS | |
| 2020year | |

| EQUIPMENT NAME | USER ID | SOLD DATE | EQUIPMENT STATE |
|---|---|---|---|

NO DATA

Sidebar:
- daedonG
- MAIN
- DASH BOARD
- MODEL MANAGEMENT
- EQUIPMENT LIST
- EQUIPMENT REGISTRATION (SALE)
- CUSTOMIZED STATISTICS
- USE PATTERN
- ENVIRONMENTAL DATA
- CUSTOMER SERVICE
- TREND ANALYSIS
- MANAGER

S1

AGRICULTURAL VEHICLE MANAGEMENT SYSTEM AND OPERATING METHOD THEREFOR

The present application is a U.S. national phase application under 35 U.S.C. § 371 of International Application No. PCT/KR2021/004663, filed on Apr. 13, 2021, which claims the benefit of Korean Patent Applications Nos. 10-2020-0145688 filed on Nov. 4, 2020, and 10-2020-0149728, 10-2020-0149729, and 10-2020-0149730 each filed on Nov. 10, 2020, in the Korean Intellectual Property Office, the entire disclosure of each of which is incorporated herein by reference.

TECHNICAL FIELD

The present disclosure relates to a management system for an agricultural vehicle and an operating method therefor. Specifically, the present disclosure relates to a system and method for obtaining information when an agricultural vehicle malfunctions, a system and method for monitoring driving of the agricultural vehicle, a system and method for notifying a lifespan of the agricultural vehicle or a component thereof, and a system and method for sharing authority to use the agricultural vehicle.

BACKGROUND ART

Telematics is a vehicle wireless Internet service in which a vehicle and wireless communication are combined. Various services, such as news reception, stock investment, electronic commerce, financial transaction, hotel reservation, facsimile transmission and reception, games, and vehicle accident and theft prevention, are possible in vehicles according to a service type, and thus interest in telematics technology is greatly increasing.

DESCRIPTION OF EMBODIMENTS

Technical Problem

An object of the present disclosure is to provide a system and method for obtaining information when an agricultural vehicle malfunctions by using a system and method for supporting a telematics service.

Another object of the present disclosure is to provide a system and method for temporally and spatially monitoring driving of an agricultural vehicle by using a system and method for supporting a telematics service.

Another object of the present disclosure is to provide a system and method for notifying a lifespan of an agricultural vehicle or a component thereof by using a system and method for supporting a telematics service.

Another object of the present disclosure is to provide a system and method for sharing authority to use an agricultural vehicle by using a system and method for supporting a telematics service.

However, these objects are only examples and the scope of the present disclosure is not limited thereby.

Technical Solution to Problem

One aspect of the present disclosure provides a system for obtaining information when an agricultural vehicle malfunctions, the system including an agricultural vehicle in which a terminal including a processor and a communication module is mounted, and a server communicatively connected to the terminal, wherein the processor of the terminal may generate a malfunction code when malfunction is detected through a sensor included in the agricultural vehicle, and, when the malfunction code is generated, operate in at least one of a first mode in which raw data obtained during a certain period of time from a time point at which the malfunction code is generated is transmitted to the server through the communication module, and a second mode in which raw data during a certain first period of time before the time point at which the malfunction code is generated and raw data during a certain second period of time after the time point at which the malfunction code is generated are transmitted to the server through the communication module.

According to an embodiment, the processor of the terminal may sample raw data and transmits the sampled raw data to the server while the malfunction of the agricultural vehicle is not detected through the sensor, the first mode may be a mode in which the raw data obtained during the certain period of time from the time point at which the malfunction code is generated is transmitted to the server without sampling, and the second mode may be a mode in which the raw data during the certain first period of time before the time point at which the malfunction code is generated is transmitted to the server without sampling, and the raw data during the certain second period of time after the time point at which the malfunction code is generated is transmitted to the server without sampling.

According to an embodiment, the processor of the terminal may transmit the malfunction code to the server, when the malfunction code is generated, and the server may transmit a malfunction notification according to the malfunction code to an electronic device of a service representative of the agricultural vehicle.

According to an embodiment, the processor of the terminal may transmit the malfunction code to the server, when the malfunction code is generated, and the server may, in response to receiving the malfunction code, transmit location information of the agricultural vehicle to at least one of an electronic device of a service representative of the agricultural vehicle, an electronic device of a purchaser of the agricultural vehicle, and an emergency contact electronic device.

According to an embodiment, the processor of the terminal may control a sound device of the agricultural vehicle to output sound, when the malfunction of the agricultural vehicle is detected through the sensor.

Another aspect of the present disclosure provides an operation method of a terminal mounted on an agricultural vehicle, the operation method including generating a malfunction code when malfunction is detected through a sensor included in the agricultural vehicle, and, when the malfunction code is generated, operating in at least one of a first mode in which raw data obtained during a certain period of time from a time point at which the malfunction code is generated is transmitted to a server through a communication module included in the agricultural vehicle, and a second mode in which raw data during a certain first period of time before the time point at which the malfunction code is generated and raw data during a certain second period of time after the time point at which the malfunction code is generated are transmitted to the server.

According to an embodiment, the operation method may further include sampling raw data and transmitting the sampled raw data to the server while the malfunction of the agricultural vehicle is not detected through the sensor, wherein the first mode may be a mode in which the raw data obtained during the certain period of time from the time point at which the malfunction code is generated is transmitted to the server without sampling, and the second mode may be a mode in which the raw data during the certain first period of time before the time point at which the malfunction code is generated is transmitted to the server without sampling, and the raw data during the certain second period of time after the time point at which the malfunction code is generated is transmitted to the server without sampling.

Aspects, features, and advantages other than those described above will become apparent from the following drawings, claims, and detailed description.

Advantageous Effects of Disclosure

According to an embodiment of the present disclosure configured as described above, information when an agricultural vehicle malfunctions can be obtained to estimate, diagnose, and track a state of the agricultural vehicle.

In addition, the driving of the agricultural vehicle can be monitored temporally or spatially. For example, it is possible to identify whether the agricultural vehicle is normally driven or stolen by monitoring whether the agricultural vehicle is driven within a designated time or space.

In addition, a remaining lifespan of the agricultural vehicle or consumable component thereof can be monitored in real time according to the use of the agricultural vehicle. In addition, a notification about inspection or replacement of the agricultural vehicle or consumable component thereof can be received.

In addition, an owner of the agricultural vehicle can grant the authority to use the agricultural vehicle to a third party. Accordingly, the owner of the agricultural vehicle may increase incomes via a sharing economy using the agricultural vehicle.

However, the scope of the present disclosure is not limited by these effects.

BRIEF DESCRIPTION OF DRAWINGS

FIG. 3 is a screen (S1) for managing model information of the agricultural vehicle (10), according to an embodiment of the present disclosure.

MODE OF DISCLOSURE

Figure 1:
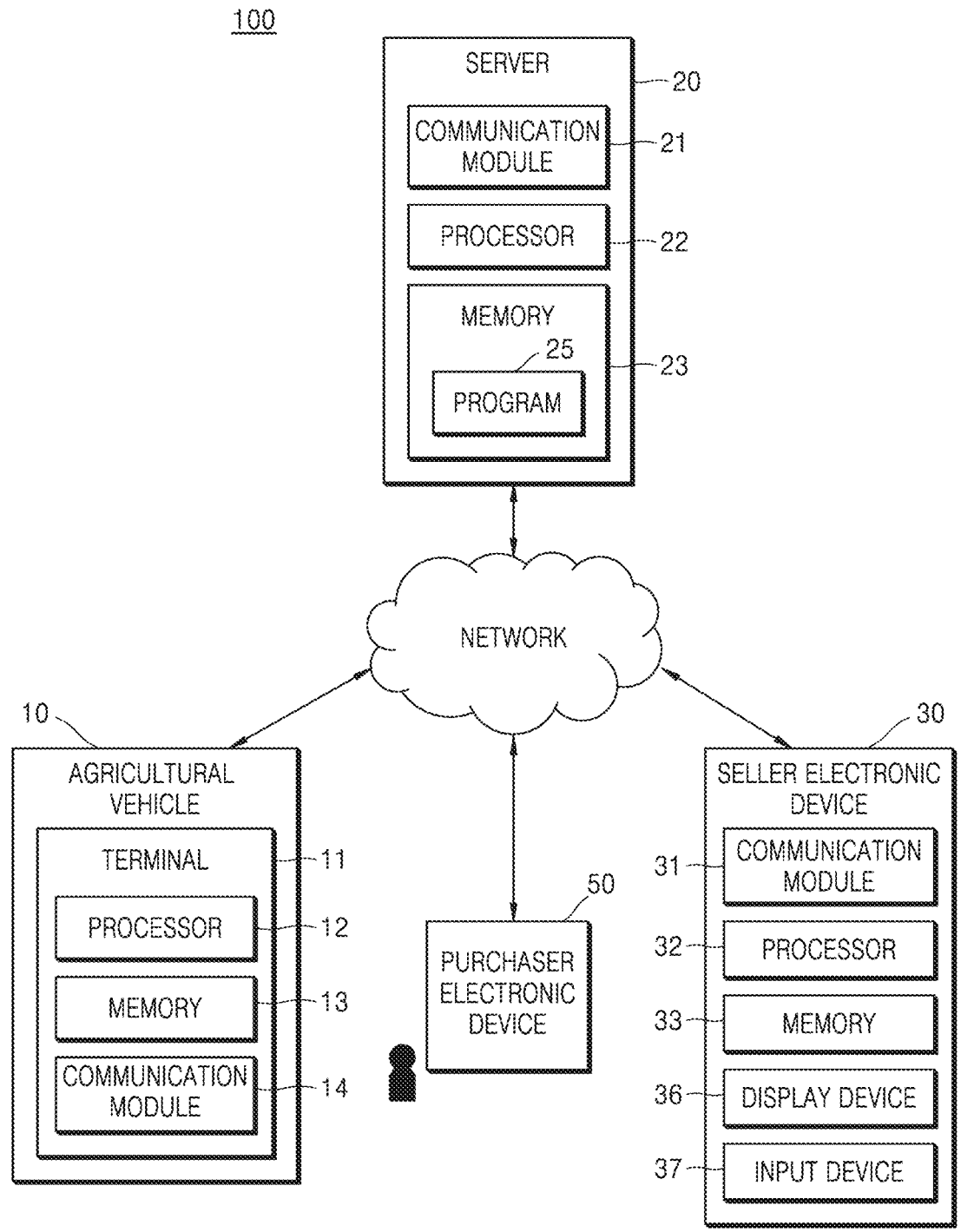
FIG. 1 illustrates a configuration of a system (100) for supporting a telematics service of an agricultural vehicle according to an embodiment of the present disclosure.

The present disclosure may have various modifications and various embodiments, and specific embodiments are illustrated in the drawings and are described in detail in the detailed description. Effects and features of the present disclosure and methods of achieving the same will become apparent with reference to embodiments described in detail with reference to the drawings. However, the present disclosure is not limited to the embodiments described below, and may be implemented in various forms.

Hereinafter, the embodiments of the present disclosure will be described in detail with reference to the accompanying drawings, and in the following description with reference to the drawings, like reference numerals refer to like components and redundant descriptions thereof will be omitted.

In the following embodiments, the terms "first," "second," and the like are not used in a limited sense and are used to distinguish one component from another component.

In the following embodiments, an expression used in the singular encompasses the expression of the plural, unless it has a clearly different meaning in the context.

In the following embodiments, it will be further understood that the terms "includes" and/or "including" used herein specify the presence of stated features or components, but do not preclude the presence or addition of one or more other features or components.

In the drawings, for convenience of description, sizes of components may be exaggerated or reduced. For example, because sizes and thicknesses of components in the drawings are arbitrarily illustrated for convenience of description, the present disclosure is not necessarily limited thereto.

In the following embodiments, when components, blocks, and modules are connected, the components, the blocks, and the modules may be directly connected to each other, or may be indirectly connected to each other with another component, block, or module therebetween.

FIG. 1 illustrates a configuration of a system 100 for supporting a telematics service of an agricultural vehicle according to an embodiment of the present disclosure.

Referring to FIG. 1, the system 100 for supporting a telematics service of an agricultural vehicle according to an embodiment of the present disclosure may include an agricultural vehicle 10 in which a terminal 11 is mounted, a server 20, a purchaser electronic device 50, and/or a seller electronic device 30. For example, the terminal 11, the purchaser electronic device 50, the server 20, and the seller electronic device 30 may be communicatively connected via a network.

The agricultural vehicle 10 may be, for example, an agricultural machine such as a tractor. The agricultural vehicle 10 may be driven unmanned (i.e., without a driver) or may be driven under control of a driver.

The terminal 11 is a telematics terminal and is mounted or installed in the agricultural vehicle 10. The terminal 11 may include a processor 12 configured to perform various data processing or operations, a memory 13 configured to store types of pieces of data used by the processor 12, a communication module 14 configured to communicate with an external device such as the server 20, and the like.

The server 20 may support a telematics service for the agricultural vehicle 10 in which the terminal 11 is mounted. To this end, the server 20 may include a communication module 21 and may be communicatively connected to the agricultural vehicle 10 (e.g., the terminal 11 of the agricultural vehicle 10) through the communication module 21. The server 20 may also be communicatively connected to the seller electronic device 30. In addition, the server 20 includes a memory 23 configured to store a program 25 supporting the telematics service. A processor 22 of the server 20 may execute the program 25 to perform data processing or operation for the telematics service. The processor 22 may load a command or data onto the memory 23 (e.g., a volatile memory), process the stored command or data, and store result data in the memory 23 (e.g., a non-volatile memory). The server 20 may be, for example, a cloud server.

The seller electronic device 30 is an electronic device of a seller who sells the agricultural vehicle 10. The seller electronic device 30 may include, for example, a computer device, a portable communication device (e.g., a tablet or a smart phone), or the like, but the present disclosure is not limited thereto.

The seller electronic device 30 may include a communication module 31 for communicating with an external device such as the server 20, a processor 32 configured to perform various data processing or operations, and a memory 33 configured to store various types of pieces of data used by the processor 32 or the like.

In addition, the seller electronic device 30 may include a display device 36 and an input device 37. The display device 36 may visually provide information to the outside (e.g., a user) of the seller electronic device 30. The display device 36 may be, for example, a display. The input device 37 may receive a command or data to be used in at least one component (e.g., the processor 32) of the seller electronic device 30 from the outside (e.g., the user). The input device 37 may include, for example, a mouse, a keyboard, a touch pad, a touch screen, or the like.

The purchaser electronic device 50 is an electronic device of a purchaser who purchased the agricultural vehicle 10 in which the terminal 11 is mounted, and may include, for example, a computer device, a tablet, a smart phone, or the like, but the present disclosure is not limited thereto. The purchaser electronic device 50 may store a program (e.g., an application) for the telematics service.

However, each of the components of the present disclosure is not limited thereto. For example, the system 100 may further include other components other than the terminal 11, the server 20, the seller electronic device 30, and the purchaser electronic device 50. In addition, other components may be added to each of the agricultural vehicle 10, the terminal 11, the server 20, the purchaser electronic device 50, and the seller electronic device 30, or some components may be omitted.

According to an embodiment of the present disclosure, the seller electronic device 30 may receive information about the purchaser of the agricultural vehicle 10, information about the agricultural vehicle 10, and information about the terminal 11. For example, when the purchaser purchases the agricultural vehicle 10, the seller may input the information about the purchaser of the vehicle 10, the information about the vehicle 10, and the information about the terminal 11 installed in the vehicle 10 to the seller electronic device 30. The seller electronic device 30 may transmit the input information to the server 20. The server 20 may store the information about the purchaser of the agricultural vehicle 10, the information about the agricultural vehicle 10, and the information about the terminal 11 installed in the agricultural vehicle 10 in the memory 23 in association with each other.

According to an embodiment, the information about the purchaser may include a name, an age, and a contact number of the purchaser, or the like. When the seller inputs the information about the purchaser to the seller electronic device 30, the server 20 may generate an account of the purchaser by using the information about the purchaser transmitted from the seller electronic device 30. The account of the purchaser may be associated with, for example, the name, age, and contact number of the purchaser, or the like.

According to an embodiment, the information about the agricultural vehicle 10 may include model information of the agricultural vehicle 10 and identification information (e.g., a vehicle identification number) of the agricultural vehicle 10. For example, the seller may register the information about the vehicle 10 in association with the account of the purchaser to the server 20 by inputting the information about the agricultural vehicle 10 purchased by the purchaser to the seller electronic device 30.

According to an embodiment, the information about the terminal 11 may be a serial number of the telematics terminal mounted in the vehicle 10. For example, the seller may register the terminal 11 in the server 20 by inputting the information about the terminal 11 to the seller electronic device 30 in association with the account of the purchaser.

When registration of the account of the purchaser and registration of the vehicle 10 and the terminal 11 are completed by the seller electronic device 30, the purchaser may access a program (e.g., an application) through the purchaser electronic device 50 (e.g., a smart phone, a tablet, a computer, or the like) or the terminal 11 to inquire the vehicle 10 of the purchaser and use the telematics service.

Meanwhile, the server 20 according to an embodiment of the present disclosure may not only store and manage the account of the purchaser as described above, but also store and manage an account of a manager for the telematics service.

The processor 22 of the server 20 may manage an organization chart of a plurality of managers through the program 25, issue and manage a manager account of a new manager in an organization, and manage authority of the accounts, based on a user input through the manager account.

Figure 2:
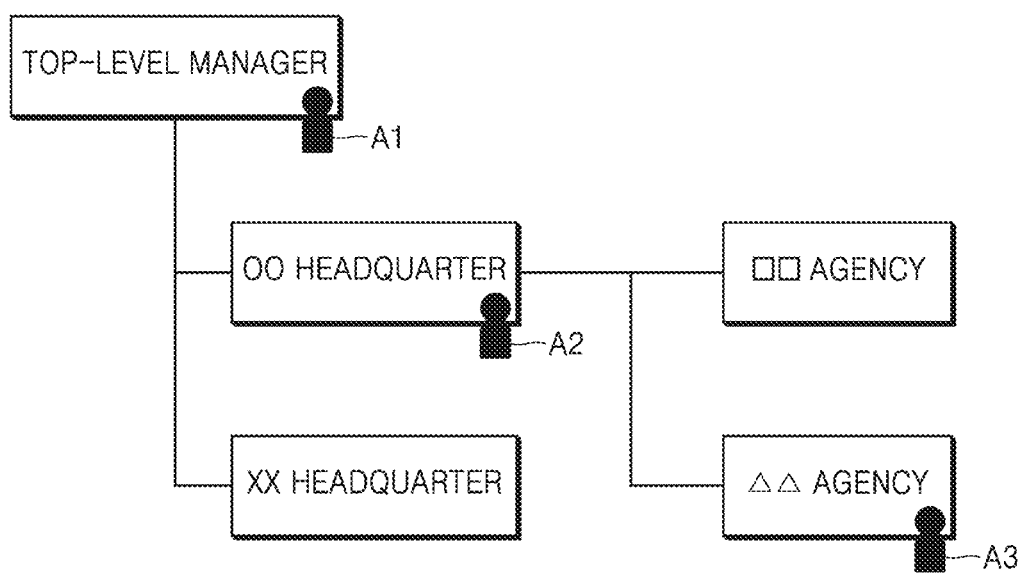
FIG. 2 is a diagram for describing an organization chart (200) and manager accounts (A1, A2, and A3) for a telematics service, according to an embodiment of the present disclosure.

FIG. 2 is a diagram for describing an organization chart 200 and manager accounts A1, A2, and A3 for a telematics service, according to an embodiment of the present disclosure.

For example, a top-level manager account A1 for the telematics service may be generated in advance through the program 25 of the server 20. The server 20 may generate and manage an organization chart for local headquarters, based on a user input through the top-level manager account A1. In addition, the server 20 may issue the manager account A2 of each local headquarter, based on a user input through the top-level manager account A1. In other words, the top-level manager account A1 may be assigned with authority to generate the organization chart for the local headquarters and authority to issue the manager account A2 of each local headquarter.

The server 20 may register an agency belonging to each region in the organization chart 200, based on a user input through the manager account A2 of the local headquarter. In addition, the server 20 may issue the manager account A3 of each agency, based on a user input through the manager account A2 of each local headquarter. In other words, the manager account A2 of the local headquarter may be assigned with authority to register an agency belonging to the region in the organization chart 200 and authority to issue the manager account A3 of each agency.

The manager accounts including the top-level manager account A1, the manager account A2 of the local headquarter, and the manager account A3 of the agency may manage authority of various accounts (e.g., a seller account and a service representative account) included in the organization.

FIG. 3 is a screen S1 for managing model information of the agricultural vehicle 10, according to an embodiment of the present disclosure. A service representative included in the organization providing the telematics service may manage the model information of the agricultural vehicle 10 through the screen S1 of an electronic device.

The program 25 of the server 20 may provide a service for managing the model information of the agricultural vehicle in which the terminal is mounted. For example, the screen S1 may be displayed on the electronic device of the service representative, based on the execution of the program 25. In other words, the service representative account has authority to access the screen S1 for managing the model information of the vehicle 10.

The service representative may access the service representative account through the electronic device and input the model information of the vehicle 10 in which the telematics terminal 11 is mounted. The model information may include a model name, a horsepower, a release year, a factory price, and/or a gear type of the agricultural vehicle 10. The model information may further include a photograph and/or a detailed description of the agricultural vehicle 10. For example, the service representative may input and manage the model information of the agricultural vehicle 10 through the screen S1.

The server 20 may store and manage the model information of the agricultural vehicle 10, based on a user input through the service representative account. The server 20 may store, as the model information of the agricultural vehicle 10 in which the terminal 11 is mounted, at least one of the model name, the horsepower, the release year, the factory price, the gear type, the photograph, and the detailed description of the vehicle 10 in association with each other.

Meanwhile, in an embodiment, the server 20 may receive controller area network (CAN) data (i.e., CAN ID) and a malfunction code of the agricultural vehicle 10 from the terminal 11 of the agricultural vehicle 10. The server 20 may collect and store the CAN data and the malfunction code received from the agricultural vehicle 10. In addition, the server 20 may store information about a consumable component to be replaced or inspected in the agricultural vehicle 10.

Here, the CAN ID, the malfunction code, and the consumable component to be replaced may be different for each model of the agricultural vehicle 10. Accordingly, the server 20 may store which data is collected for each model of the agricultural vehicle 10. Specifically, the server 20 may store a list of CAN IDs, a list of malfunction codes, and a list of consumable components to be replaced for each model, as the collected data for each model.

In this regard, the service representative may access the service representative account through the electronic device and input which data is collected for each model of the agricultural vehicle 10. The service representative may input the list of CAN IDs, the list of malfunction codes, and the list of consumable components to be replaced, as the collected data for each model of the agricultural vehicle 10.

The server 20 may store the model information of the agricultural vehicle in association with the collected data for each model.

Meanwhile, as described above, the server 20 may store the model information (e.g., a model name) and the identification information (e.g., a vehicle identification number) of the sold agricultural vehicle 10, based on an input of the seller when the purchaser purchases the agricultural vehicle 10. In addition, the model name may be associated with at least one of the horsepower, the release year, the factory price, the gear type, the photograph, and the detailed description as described above, and such model information may be stored by the service representative.

Based on the storing, the server 20 may provide a function of searching for a vehicle by using information about the vehicle 10, through the program 25. For example, the seller or the purchaser may search for a vehicle by using information (e.g., identification information and model information) about the vehicle through a program (e.g., an application) in an electronic device.

Based on the storing, the server 20 may provide information about sales volume of the vehicle model in which the telematics terminal 11 is mounted, through the program 25. According to an embodiment, the server 20 may calculate statistics about the sales volume of the agricultural vehicle 10 according to various standards. For example, the server 20 may calculate the statistics of the sold agricultural vehicle 10 according to the model name, the region of the purchaser, the age of the purchaser, or the horsepower of the agricultural vehicle 10. For example, the seller or the purchaser may view the statistics through an application in the electronic device.

Meanwhile, the seller or service representative may input a history (e.g., a production date, a shipment date, a sold date, a sold store, and the like) of each agricultural vehicle 10 through a telematics program. The history may be stored in the memory 23 of the server 20, and based on the storing, the server 20 may provide information about the history of each agricultural vehicle 10 through the program 25. For example, the seller or the purchaser may view the information about the history (e.g., the production date, the shipment date, the sold date, and the sold store) of the agricultural vehicle 10 through the application in the electronic device.

Figure 4:
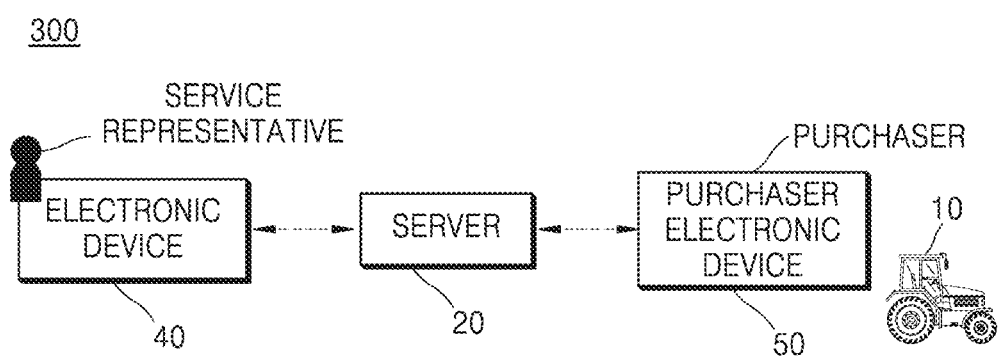
FIG. 4 is a illustrates a configuration of a system (300) for managing a customer of a telematics service, according to an embodiment of the present disclosure.

FIG. 4 is a illustrates a configuration of a system 300 for managing a customer of a telematics service, according to an embodiment of the present disclosure. Here, the customer refers to a purchaser who has purchased the agricultural vehicle 10 in which the telematics terminal 11 is mounted.

Referring to FIG. 4, the system 300 for managing a customer according to an embodiment of the present disclosure includes an electronic device 40 of a service representative, the server 20, and the purchaser electronic device 50. The electronic device 40 of the service representative and the purchaser electronic device 50 may each include, for example, a computer device, a tablet, a smart phone, or the like, but the present disclosure is not limited thereto. The purchaser electronic device 50 may store a program (e.g., an application) for the telematics service.

The service representative may upload a notice or a survey about the agricultural vehicle 10 or the telematics service, through the electronic device 40. The notice or survey input through the electronic device 40 of the service representative may be transmitted to the server 20 and stored therein. Once the notice or survey is stored, the server 20 may transmit a push notification (regarding the notice or survey) to the purchaser electronic device 50.

According to an embodiment, the service representative may specify the purchaser electronic device 50 for receiving the push notification by applying various filters when uploading the notice or survey. For example, the service representative may designate a filter according to a purchase date of the agricultural vehicle 10, the model name of the agricultural vehicle 10, or the like, and upload the notice or survey.

Figure 5:
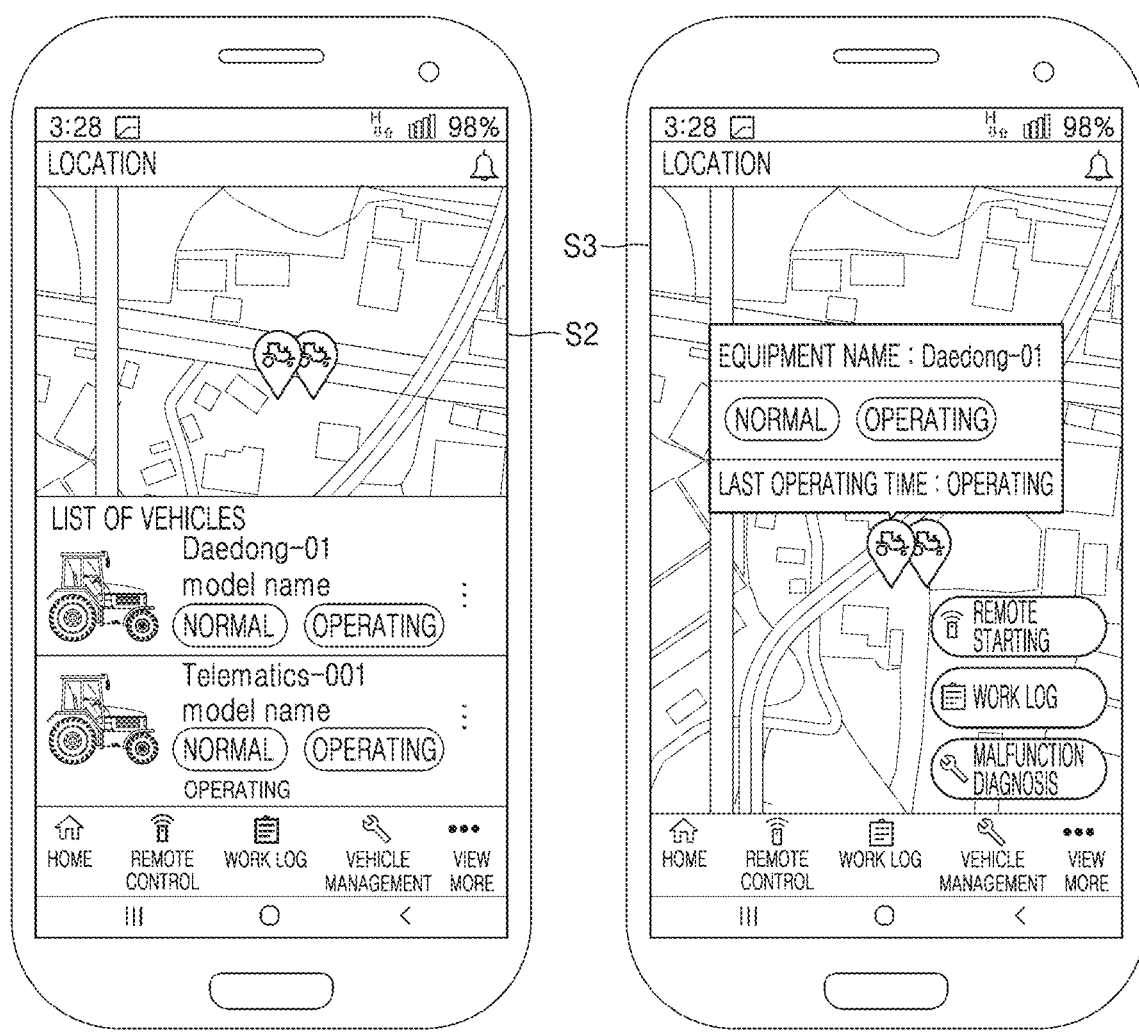
FIG. 5 illustrates screens (S2 and S3) of a purchaser electronic device (50) using a telematics service, according to an embodiment of the present disclosure.

FIG. 5 illustrates screens S2 and S3 of the purchaser electronic device 50 using a telematics service, according to an embodiment of the present disclosure. The screens S2 and S3 are examples of screens of a telematics service program (e.g., an application) and may be displayed on the purchaser electronic device 50.

The purchaser may identify an entire list of the possessed vehicles 10 and a state of each vehicle 10 through the screens S2 and S3 of the purchaser electronic device 50. For example, the purchaser may identify, in real time, a location, a start-up state, and malfunction of each vehicle 10, as the state of each vehicle 10, through the screens S2 and S3.

To this end, the terminal 11 of the agricultural vehicle 10 may upload location information collected via a global positioning system (GPS), on the server 20 in real time (e.g., at certain intervals). In addition, the terminal 11 may upload data indicating whether the agricultural vehicle 10 is started, on the server 20 in real time (for example, at certain intervals). In addition, the terminal 11 may transmit data (e.g., a malfunction code) indicating whether the agricultural vehicle 10 malfunctions, on the server 20. For example, the terminal 11 may upload the malfunction code on the server 20, based on generation of the malfunction code.

The purchaser electronic device 50 may execute the telematics service program (e.g., an application) on the basis of state information (e.g., the location information, the start-up state, and the malfunction code) uploaded on the server 20 to display the screens S2 and S3.

Figure 6:
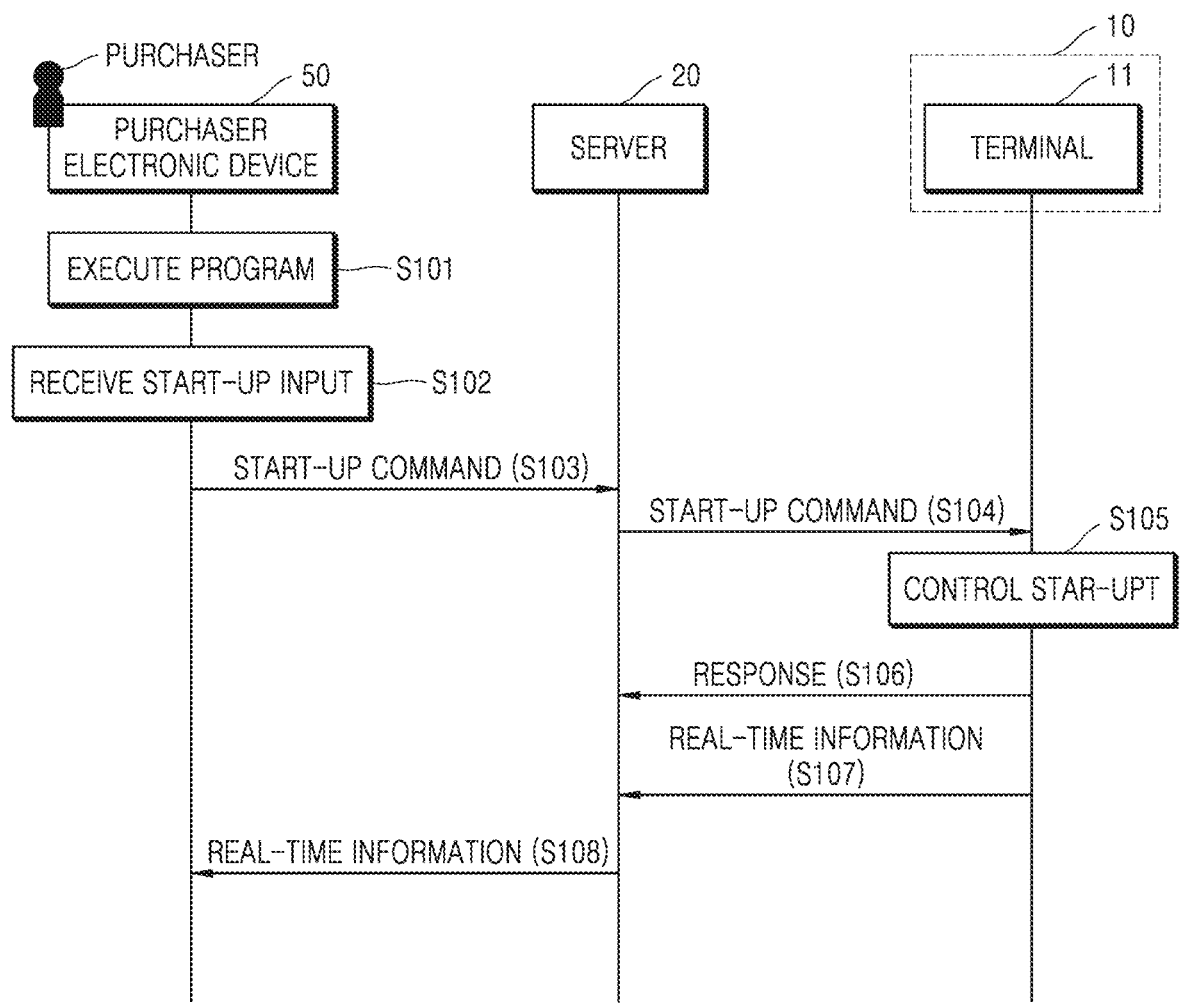
FIG. 6 illustrates an example of a signal flow when the agricultural vehicle (10) is driven unmanned in a telematics service, according to an embodiment of the present disclosure.

FIG. 6 illustrates an example of a signal flow when the agricultural vehicle 10 is driven unmanned in the telematics service, according to an embodiment of the present disclosure. Specifically, FIG. 6 is an example of a signal flow for remotely controlling start-up for unmanned driving of the vehicle 10 in which the terminal 11 is mounted.

In operation S101, the purchaser electronic device 50 may execute a telematics service program, based on an input of a purchaser.

In operation S102, the purchaser electronic device 50 may receive a start-up input for starting the agricultural vehicle 10 at a remote place from the outside (the purchaser) through the program. For example, the purchaser may select one vehicle from the entire list of the possessed agricultural vehicles displayed on the screen of the program, and apply a start-up input to the selected vehicle.

In operation S103, the purchaser electronic device 50 may transmit a start-up command to the server 20. For example, the electronic device 50 may transmit the start-up command to the server 20 together with identification information of the terminal 11 of the vehicle selected for start-up.

In operation S104, the server 20 may transmit the start-up command to the terminal 11 corresponding to the identification information, based on the received identification information.

In operation S105, the terminal 11 may attempt to start the agricultural vehicle 10 according to the start-up command received from the server 20.

In operation S106, the terminal 11 may transmit a response to the attempt to start-up, to the server 20. For example, when the agricultural vehicle 10 fails to start-up, the terminal 11 may transmit a failure response to the server 20. The server 20 may transmit the failure response to the purchaser electronic device 50, and based on this process, the purchaser electronic device 50 may display a start-up failure message. For example, the terminal 11 may identify a cause of a start-up failure of the vehicle 10 and transmit the failure response including a failure cause code to the server 20, and based on the failure cause code, the purchaser electronic device 50 may display the cause of the start-up failure.

For example, in the case of a successful start-up of the vehicle 10, the terminal 11 may transmit a success response to the server 20. The server 20 may transmit the success response to the purchaser electronic device 50, and based on this process, the purchaser electronic device 50 may display a start-up success message.

While the remote start-up of the vehicle 10 is successful and the vehicle 10 is running, the terminal 11 may transmit real-time information to the server 20 (for example, at certain intervals) (operation S107). The real-time information may include, for example, information about engine revolution per minute (RPM) of the vehicle 10, an oil temperature, a coolant temperature, and a speed of the vehicle 10.

In operation S108, the server 20 may identify a purchaser account associated with the terminal 11 and transmit the real-time information to the purchaser electronic device 50.

Figure 7:
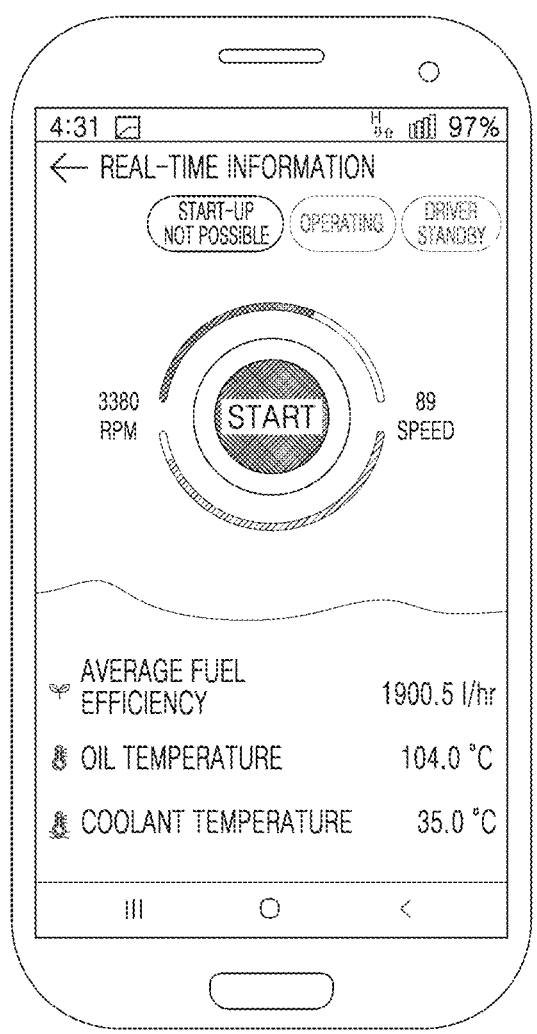
FIG. 7 illustrates an example of a screen displaying real-time information about the vehicles (10) in a purchaser electronic device (50), according to an embodiment of the present disclosure.

Based on this process, the real-time information may be displayed on the purchaser electronic device 50. For example, FIG. 7 illustrates an example of a screen displaying the real-time information about the vehicle 10 in the purchaser electronic device 50, according to an embodiment of the present disclosure.

Hereinafter, a system for obtaining information when an agricultural vehicle malfunctions and an operation method thereof, according to an embodiment of the present disclosure, will be described with reference to FIGS. 8 to 11.

Figure 8:
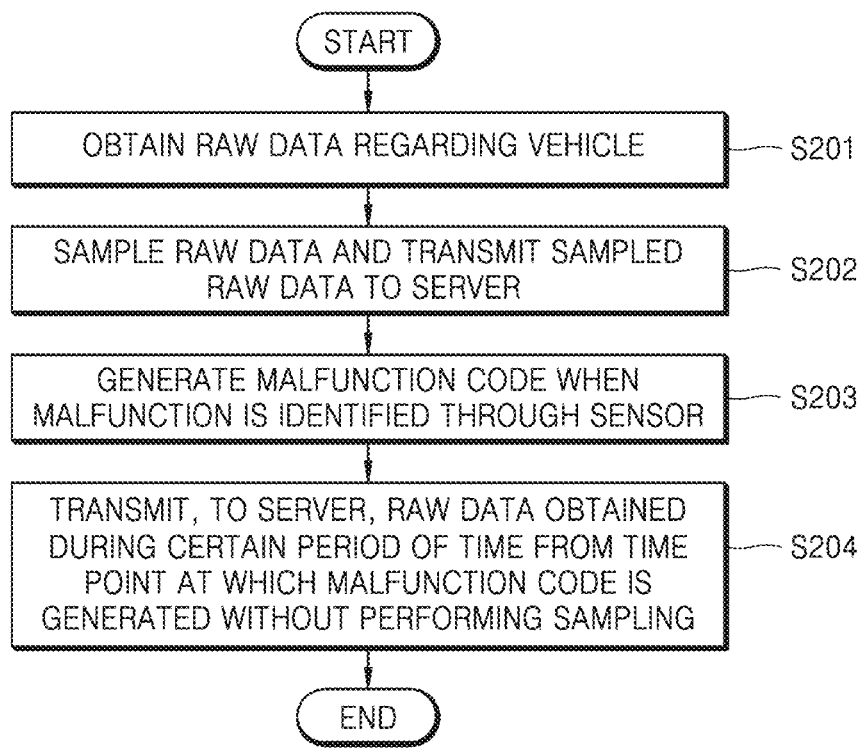
FIG. 8 is a flowchart of a method by which a terminal (11) operates in a first mode, in a method of obtaining information when an agricultural vehicle malfunctions, according to an embodiment of the present disclosure.

FIG. 8 is a flowchart of a method by which the terminal 11 operates in a first mode, in a method of obtaining information when an agricultural vehicle malfunctions, according to an embodiment of the present disclosure. Operations illustrated in FIG. 8 may be performed by the processor 12 of the terminal 11.

In operation S201, the terminal 11 may obtain raw data regarding the agricultural vehicle 10 in which the terminal 11 is mounted. For example, the raw data may be controller area network (CAN) data. However, the raw data is not limited thereto, and in an alternative embodiment, the raw data may further include image data obtained by a camera device of the vehicle 10.

In operation S202, the terminal 11 may sample the raw data and transmit the sampled raw data to the server 20. For example, the terminal 11 may sample, at designated time intervals, the raw data obtained in real time, and transmit the sampled raw data to the server 20. The time interval may be determined according to a data usage amount.

While the agricultural vehicle 10 operates without malfunction, the raw data may be sampled and transmitted to the server 20 as described above. The raw data that is not sampled may be temporarily stored, for example, in the memory 13 of the terminal 11. For example, the raw data temporarily stored in the memory 13 of the terminal 11 may be deleted after a certain time elapses. However, the present disclosure is not limited thereto.

Meanwhile, the server 20 may store, in the memory 23, the sampled raw data received from the terminal 11. For example, the server 20 may store the sampled raw data in association with identification information of the agricultural vehicle 10 (or identification information of the terminal 11) (for each vehicle 10). The sampled raw data stored in the server 20 may be used to estimate and diagnose a state of the corresponding agricultural vehicle 10.

In operation S203, the terminal 11 may identify malfunction through various sensors, and generate a malfunction code corresponding to a type of the malfunction when the malfunction is identified. For example, the terminal 11 may identify whether the vehicle 10 has collided or malfunctioned, by using data obtained via a collision sensor. For example, the terminal 11 may identify whether vehicle 10 has rolled over, by using data obtained through an inertial sensor (e.g., an inertial measurement unit (IMU)). For example, the terminal 11 may identify whether each component has malfunctioned, by using data obtained through a sensor provided in relation to each component. For example, the terminal 11 may identify whether a certain component has malfunctioned by using CAN data.

When the terminal 11 identifies the collision or rollover of the vehicle, or the malfunction of the component, as described above, a malfunction code corresponding thereto may be generated. The terminal 11 may transmit the generated malfunction code to the server 20.

In operation S204, the terminal 11 may operate in the first mode in which raw data obtained during a certain period of time from a time point when the malfunction code is generated is transmitted to the server 20 without sampling. Meanwhile, the raw data stored in the server 20 during the first mode may be used to estimate and diagnose a malfunction state of the agricultural vehicle 10.

Figure 9:
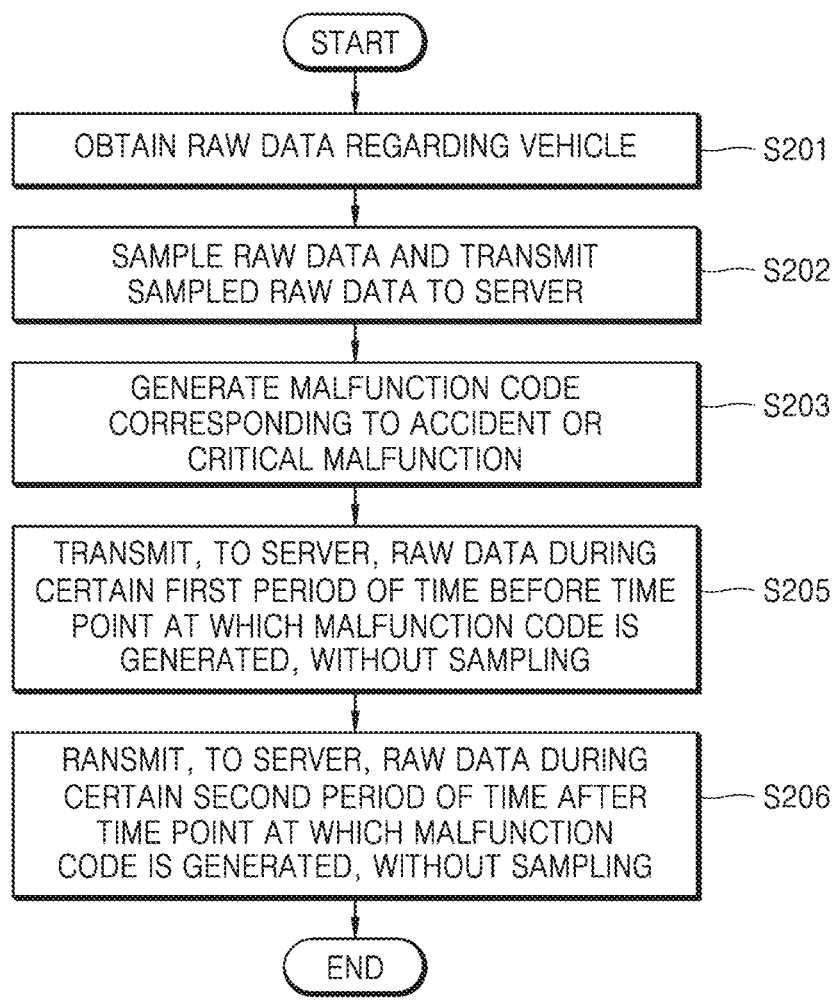
FIG. 9 is a flowchart of a method by which the terminal (11) operates in a second mode, in the method of obtaining information when the agricultural vehicle malfunctions, according to an embodiment of the present disclosure.

FIG. 9 is a flowchart of a method by which the terminal 11 operates in a second mode, in the method of obtaining information when the agricultural vehicle 10 malfunctions, according to an embodiment of the present disclosure. Operations illustrated in FIG. 9 may be performed by the processor 12 of the terminal 11.

According to an embodiment, the terminal 11 may operate in the second mode as below at a time of an accident of the agricultural vehicle 10, at a time of critical malfunction, and/or at a time requested by a manufacturer of the agricultural vehicle 10.

Since operations S201, S202, and S203 shown in FIG. 9 correspond to those of FIG. 8, a description thereof will be briefly provided.

In operation S201, the terminal 11 may obtain raw data regarding the agricultural vehicle 10 in which the terminal 11 is mounted. For example, the raw data may be controller area network (CAN) data and/or image data obtained by a camera device.

In operation S202, the terminal 11 may sample the raw data and transmit the sampled raw data to the server 20. For example, the terminal 11 may sample, at designated time intervals, the raw data obtained in real time, and transmit the sampled raw data to the server 20.

While the agricultural vehicle 10 operates without malfunction, the raw data may be sampled and transmitted to the server 20 as described above. The raw data that is not sampled may be temporarily stored, for example, in the memory 13 of the terminal 11.

In operation S203, the terminal 11 may identify an accident or critical malfunction of the vehicle through various sensors or by using the CAN data, and may generate a malfunction code corresponding to the accident or critical malfunction when the accident or critical malfunction is identified. For example, when a case, in which a component of the vehicle does not operate despite an operation control due to aging of the component, exceeds a designated frequency, the terminal 11 may identify the accident or critical malfunction of the vehicle.

When the malfunction code for the accident or critical malfunction is generated, the terminal 11 may operate in the second mode in which the terminal 11 transmits, to the server 20, raw data during a certain first period of time before a time point at which the malfunction code is generated, without sampling (operation S205), and transmits, to the server 20, raw data during a second period of time after the time point at which the malfunction code is generated, without sampling (operation S206). The first period of time and the second period of time may be the same or different from each other.

Meanwhile, according to an embodiment of the present disclosure, the terminal 11 may operate in the second mode not only at the time of the accident or critical malfunction of the agricultural vehicle 10, but also when requested by the manufacturer of the agricultural vehicle 10.

The terminal 11 of the agricultural vehicle 10 according to various embodiments of the present disclosure may operate in either the first mode or the second mode described above, or may operate in both the first mode and the second mode described above.

Figure 10:
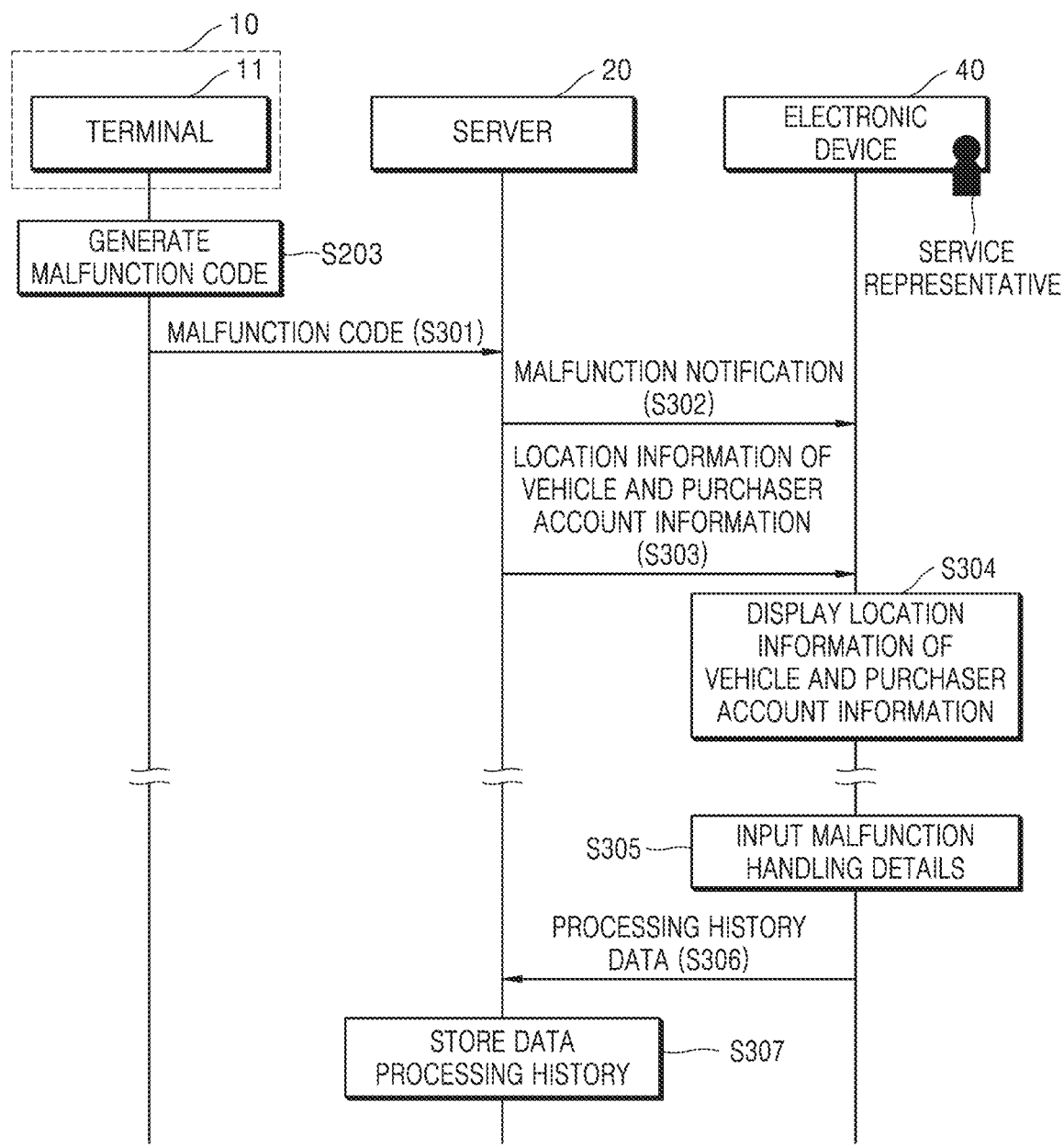
FIG. 10 is a signal flowchart of a system for obtaining information when the agricultural vehicle malfunctions, according to an embodiment of the present disclosure.

FIG. 10 is a signal flowchart of a system for obtaining information when the agricultural vehicle malfunctions, according to an embodiment of the present disclosure.

Referring to FIG. 10, in operation S203, the terminal 11 of the agricultural vehicle 10 may identify malfunction (or critical malfunction or an accident) through various sensors, and when the malfunction is identified, a malfunction code corresponding to a type of the malfunction may be generated. The description about the operation corresponds to the description about operation S203 of FIGS. 8 and 9.

When the terminal 11 generates the malfunction code, the terminal 11 may operate in at least one of the first mode and the second mode described above. In other words, the terminal 11 may transmit raw data that is not sampled to the server 20 according to at least one of the first mode and the second mode.

In addition, in operation S301, the terminal 11 may transmit the malfunction code to the server 20 through the communication module 14. For example, the terminal 11 may transmit the malfunction code together with identification information (e.g., a serial number) of the terminal 11 to the server 20.

In operation S302, the server 20 may transmit a malfunction notification according to the malfunction code to the electronic device 40 of the service representative. In an example, a corresponding service representative may be designated for each agricultural vehicle 10. For example, there may be a service representative designated according to a region of the purchaser of the agricultural vehicle 10 or a seller of the agricultural vehicle 10. Accordingly, the server 20 may transmit the malfunction notification to the electronic device 40 of the corresponding service representative, based on the identification information of the terminal 11 that has transmitted the malfunction code.

In operation S303, the server 20 may transmit location information of the vehicle 10 in which the terminal 11 is mounted and the purchaser account information of the vehicle 10 to the electronic device 40 of the service representative, based on the identification information of the terminal 11 that has transmitted the malfunction code. According to an embodiment, the server 20 may transmit the location information of the vehicle 10 and the purchaser account information of the vehicle 10 to the electronic device 40 of the service representative, based on a user input of the service representative.

For example, based on the receiving of the malfunction notification through the electronic device 40 in operation S302, the service representative may identify the location information of the vehicle 10 having malfunction and the purchaser account information of the vehicle 10, through the electronic device 40.

For example, in operation S304, the electronic device 40 of the service representative may display the location information of the vehicle 10 and the purchaser account information. The service representative may identify the purchaser account information (e.g., a contact number) and contact the purchaser to perform a procedure of entering and repairing the vehicle 10.

Thereafter, in operation S305, the service representative may input a malfunction processing history to a telematics program through the electronic device 40.

In operation S306, the electronic device 40 may transmit processing history data to the server 20, and in operation S307, the server 20 may store the processing history in a database regarding the telematics program. Based on the storing of the malfunction processing history, the service representative, the seller, or the purchaser may thereafter identify a malfunction history for each vehicle in a respective electronic device.

Figure 11:
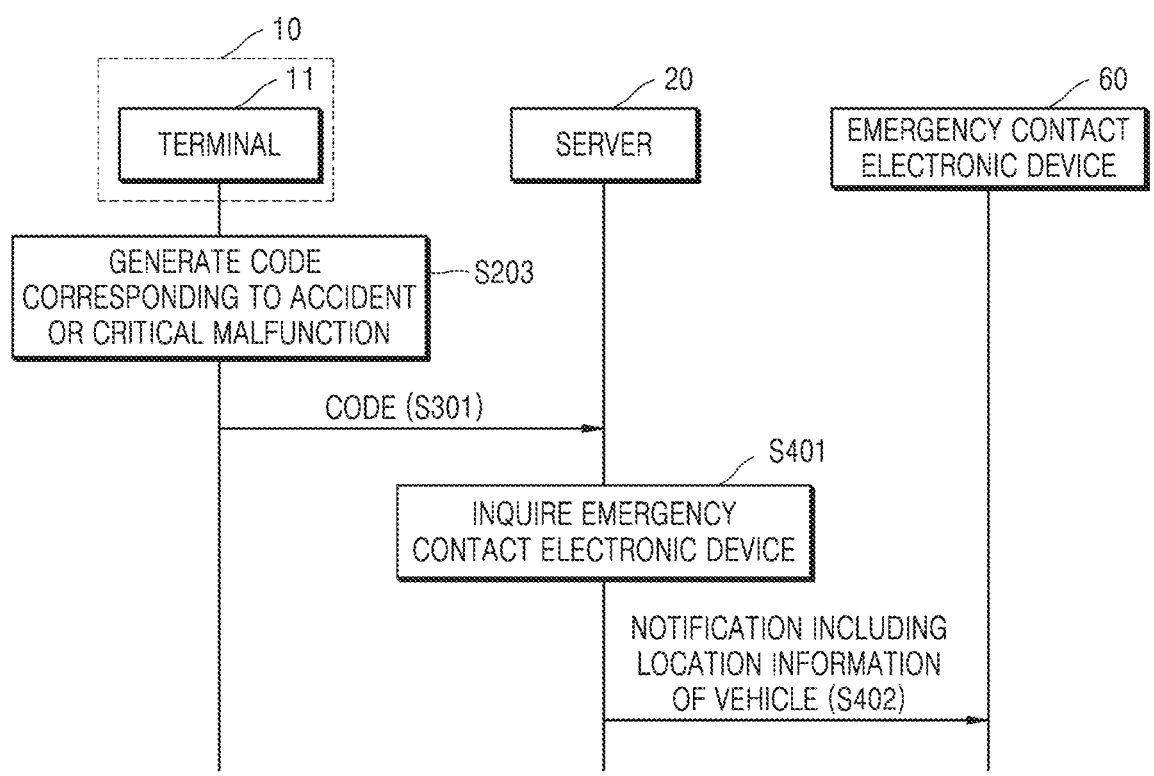
FIG. 11 is a signal flowchart of a system for obtaining information when the agricultural vehicle malfunctions, according to an embodiment of the present disclosure.

FIG. 11 is a signal flowchart of a system for obtaining information when the agricultural vehicle malfunctions, according to an embodiment of the present disclosure.

Referring to FIG. 11, in operation S203, the terminal 11 of the agricultural vehicle 10 may identify critical malfunction or an accident through various sensors, and when the terminal 11 identifies the critical malfunction or accident, the terminal 11 may generate a code corresponding to the critical malfunction or accident. According to an embodiment, the terminal 11 may identify whether the vehicle 10 has rolled over, through an inertial sensor (e.g., an IMU), and may generate a code corresponding to the rollover upon identifying the rollover of the vehicle. The description about the operation may correspond to the description about operation S203 of FIGS. 8 and 9.

When the code is generated, the terminal 11 may operate in at least one of the first mode and the second mode described above. In other words, the terminal 11 may transmit raw data that is not sampled to the server 20 according to at least one of the first mode and the second mode.

In addition, in operation S301, the terminal 11 may transmit the code to the server 20 through the communication module 14.

In operation S401, the server 20 may inquire an emergency contact electronic device to contact at a time of the accident or critical malfunction of the vehicle 10. According to an embodiment, the emergency contact electronic device may be designated and input by the purchaser of the vehicle 10, and may be stored in the server 20 in association with a purchaser account. For example, the emergency contact electronic device may include the purchaser electronic device 50 (e.g., a smart phone). According to an embodiment, the emergency contact electronic device may be irrelevant to the purchaser account, and may include, for example, an electronic device of an emergency rescue organization.

In operation S402, the server 20 may transmit a notification including location information of the vehicle 10 to the emergency contact electronic device 60. In an example, the server 20 may transmit a rescue request to the emergency rescue organization. For example, the server may transmit a short message service (SMS) to the electronic device of the emergency rescue organization.

According to various embodiments described above, when an accident (e.g., a rollover) or malfunction of the vehicle 10 is detected, the terminal 11 mounted on the agricultural vehicle 10 may transmit, to the server 20, raw data regarding the vehicle 10 without sampling, according to the first mode and/or the second mode. In addition, the server 20, which has received a malfunction code or a code corresponding to the accident from the terminal 11, may transmit a malfunction or accident notification to the emergency contact electronic device 60 so that an emergency contact person or the emergency rescue organization may be dispatched. In addition, the server 20 may transmit location information of the vehicle to the seller electronic device 30, the electronic device 40 of the service representative, or the emergency contact electronic device 60 in response to the receiving of the malfunction code or the code corresponding to the accident from the terminal 11. In addition, the server 20, which has received the malfunction code or the code corresponding to the accident from the terminal 11, may provide information (e.g., a contact number) about the purchaser of the vehicle 10 to the seller electronic device 30, the electronic device 40 of the service representative, or the emergency contact electronic device 60. According to an embodiment, when the terminal 11 detects the malfunction or accident of the vehicle 10, the terminal 11 may control a sound device to sound a buzzer of the vehicle and inform others around about the malfunction or accident of the vehicle.

Hereinafter, a system for monitoring driving of an agricultural vehicle and an operation method thereof, according to an embodiment of the present disclosure, will be described with reference to FIGS. 12 to 14.

Figure 12:
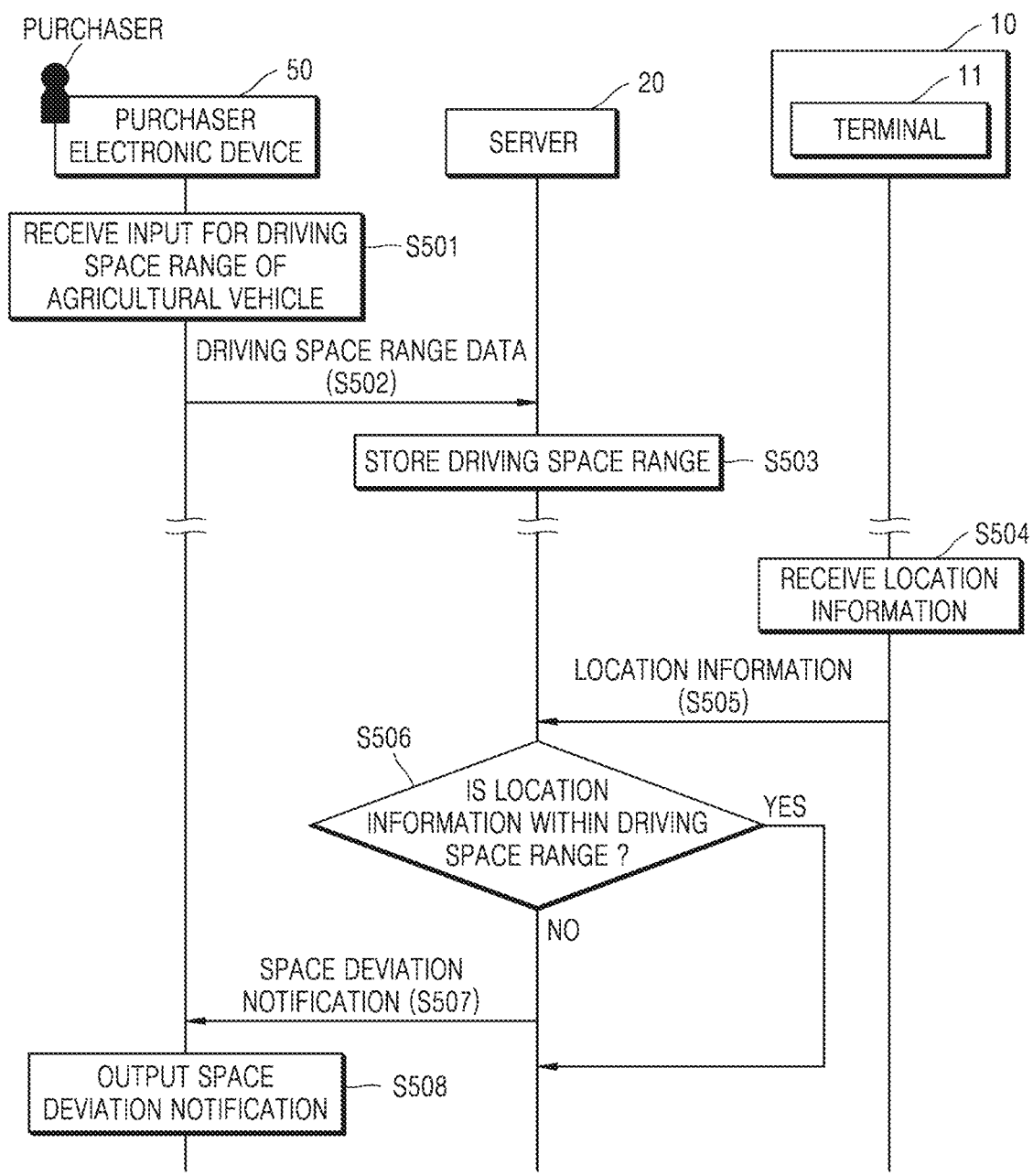
FIG. 12 is a signal flowchart of a system for monitoring driving of the agricultural vehicle, according to an embodiment of the present disclosure.

FIG. 12 is a signal flowchart of a system for monitoring driving of the agricultural vehicle, according to an embodiment of the present disclosure. FIG. 12 may be the signal flowchart when, for example, the agricultural vehicle 10 is driven unmanned, that is, when the purchaser (owner) of the agricultural vehicle 10 is remotely separated from the agricultural vehicle 10.

Referring to FIG. 12, in operation S501, the purchaser electronic device 50 may receive an input for a driving space range in which the agricultural vehicle 10 is to be driven, from the outside (e.g., from the purchaser). The input may be an input for designating a space range in which the agricultural vehicle 10 is to be driven, that is, a geo-fence. The purchaser electronic device 50 may receive the input for the driving space range on the basis of an input of the purchaser (owner).

Figure 13:
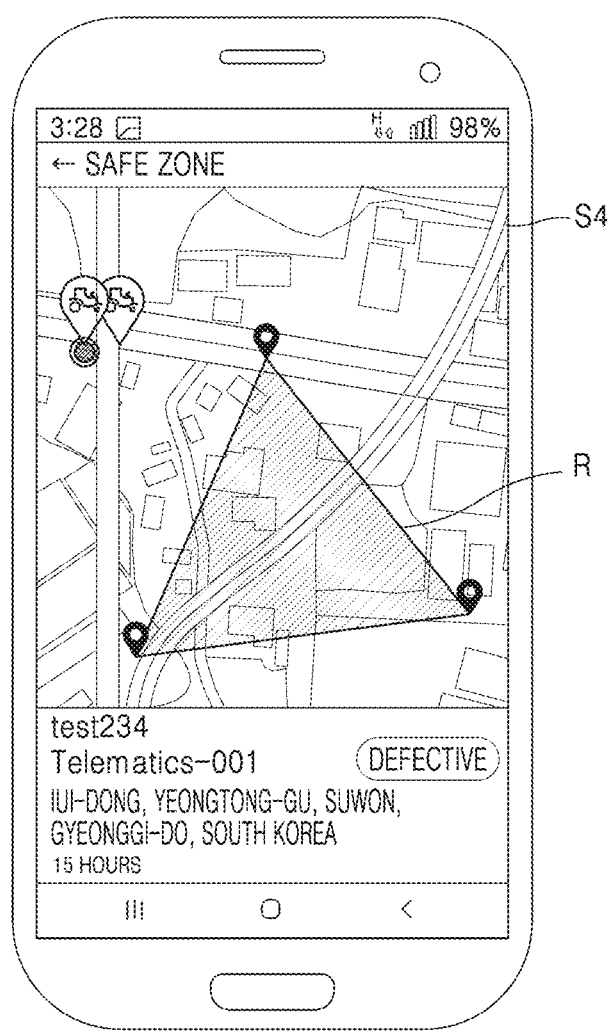
FIG. 13 illustrates an example of a screen (S4) of a telematics program, which is displayed on the purchaser electronic device (50) according to an embodiment of the present disclosure.

FIG. 13 illustrates an example of a screen S4 of a telematics program displayed on the purchaser electronic device 50, according to an embodiment of the present disclosure. Referring to FIG. 13, the purchaser may designate a driving space range R of one or more agricultural vehicles through the telematics program displayed on the screen S4. For example, the input for designating the driving space range may include an input for selecting three or more points on a map displayed through the telematics program.

In operation S502, the purchaser electronic device 50 may transmit input driving space range data to the server 20. In operation S503, the server 20 may store driving space range data for each agricultural vehicle in the memory 23.

According to an embodiment, when one purchaser possesses two or more agricultural vehicles, the purchaser may register the two or more agricultural vehicles in the telematics program, and may designate a driving space range for each agricultural vehicle. The purchaser may perform an input for designating a first driving space range of a first agricultural vehicle and an input for designating a second driving space range of a second agricultural vehicle, through the program. In this case, the server 20 may match and store data of the first agricultural vehicle and data of the first driving space range, and match and store data of the second agricultural vehicle and data of the second driving space range.

According to an embodiment of the present disclosure, the server 20 may monitor in real time whether the agricultural vehicle 10 is driven within a driving space range. This will be described in detail below.

In operation S504, the terminal 11 may receive location information of the agricultural vehicle 10. The location information may be received by using, for example, a GPS, but the present disclosure is not limited thereto. The terminal 11 may receive the location information of the agricultural vehicle 10 in real time, for example, at certain intervals.

In operation S505, the terminal 11 may transmit the location information to the server 20. The terminal 11 may transmit the location information in real time, for example, at certain intervals. For example, even while the start-up of the agricultural vehicle 10 is turned off, the terminal 11 may obtain the location information in real time and may transmit the location information to the server 20.

In operation S506, the server 20 may monitor whether the agricultural vehicle 10 is located within a driving space range designated in relation to the agricultural vehicle 10, based on the location information received from the terminal 11.

For example, the terminal 11 may transmit the location information to the server 20 together with identification information of the terminal 11, and the server 20 may identify the driving space range data stored in relation to the terminal 11 corresponding to the received identification information and identify whether the location information is within the driving space range.

When the agricultural vehicle 10 is located outside the set driving space range, the server 20 may transmit a space deviation notification to the purchaser electronic device 50 (e.g., a smart phone) in operation S507. The space deviation notification may be, for example, a push notification. In operation S508, the purchaser electronic device 50 may output the received space deviation notification. For example, the purchaser electronic device 50 may display the space deviation notification or output sound.

When the agricultural vehicle 10 is located within the set driving space range, the server 20 may not transmit a notification.

In both cases where the agricultural vehicle 10 is located within the set driving space range and where the agricultural vehicle 10 is located outside the set driving space range, the server 20 may continuously receive the location information of the terminal 11 (or the agricultural vehicle 10) to identify a location of the agricultural vehicle 10 in real time. That is, operations S505 and S506 may be repeatedly performed.

Meanwhile, the purchaser electronic device 50 may display a map including an icon indicating the location of the agricultural vehicle 10 in the telematics program, as shown in the screen S4 of FIG. 9. For example, the purchaser electronic device 50 may transmit an input signal to the server 20, based on the receiving of the input of the purchaser entering the map through the program. The server 20 may identify the location of the agricultural vehicle 10 at a current time point and transmit screen data of the map including the icon indicating the location of the agricultural vehicle to the purchaser electronic device 50. The purchaser electronic device 50 may display the map indicating the location of the agricultural vehicle, based on the screen data. For example, as shown in the screen S4, the purchaser electronic device 50 may display the map including the driving space range R and the icon indicating the location of the agricultural vehicle 10, based on the data received from the server. The map may be displayed by highlighting the driving space range R.

Through the system for monitoring the driving of the agricultural vehicle described above, the purchaser may set the agricultural vehicle 10 to be driven unmanned only within a desired space range. In addition, through the operations of the system described above, the purchaser may identify in real time whether the agricultural vehicle 10 is stolen or the like.

According to an embodiment, the server 20 may transmit a control signal for turning off the start-up of the vehicle 10 to the terminal 11 in response to the identifying of the agricultural vehicle 10 being located outside the set driving space range. Accordingly, when the vehicle 10 is outside the set driving space range, the start-up of the vehicle 10 may be turned off under control of the server 20 and terminal 11.

According to an embodiment, the server 20 may transmit, to the terminal 11, a control signal for sounding a horn or buzzer of the agricultural vehicle 10, based on the identifying of the vehicle 10 being located outside the driving space range. Through this embodiment, a vehicle that deviates from a space range may be easily found.

According to an embodiment, the server 20 may transmit a control signal for turning on emergency lights of the vehicle 10 to the terminal 11, based on the identifying of the agricultural vehicle 10 being located outside the driving space range. Accordingly, when the vehicle 10 is outside the set driving space range, the emergency lights may be turned on under control of the server 20 and terminal 11. Through this embodiment, a vehicle that deviates from a space range may be easily found.

Figure 14:
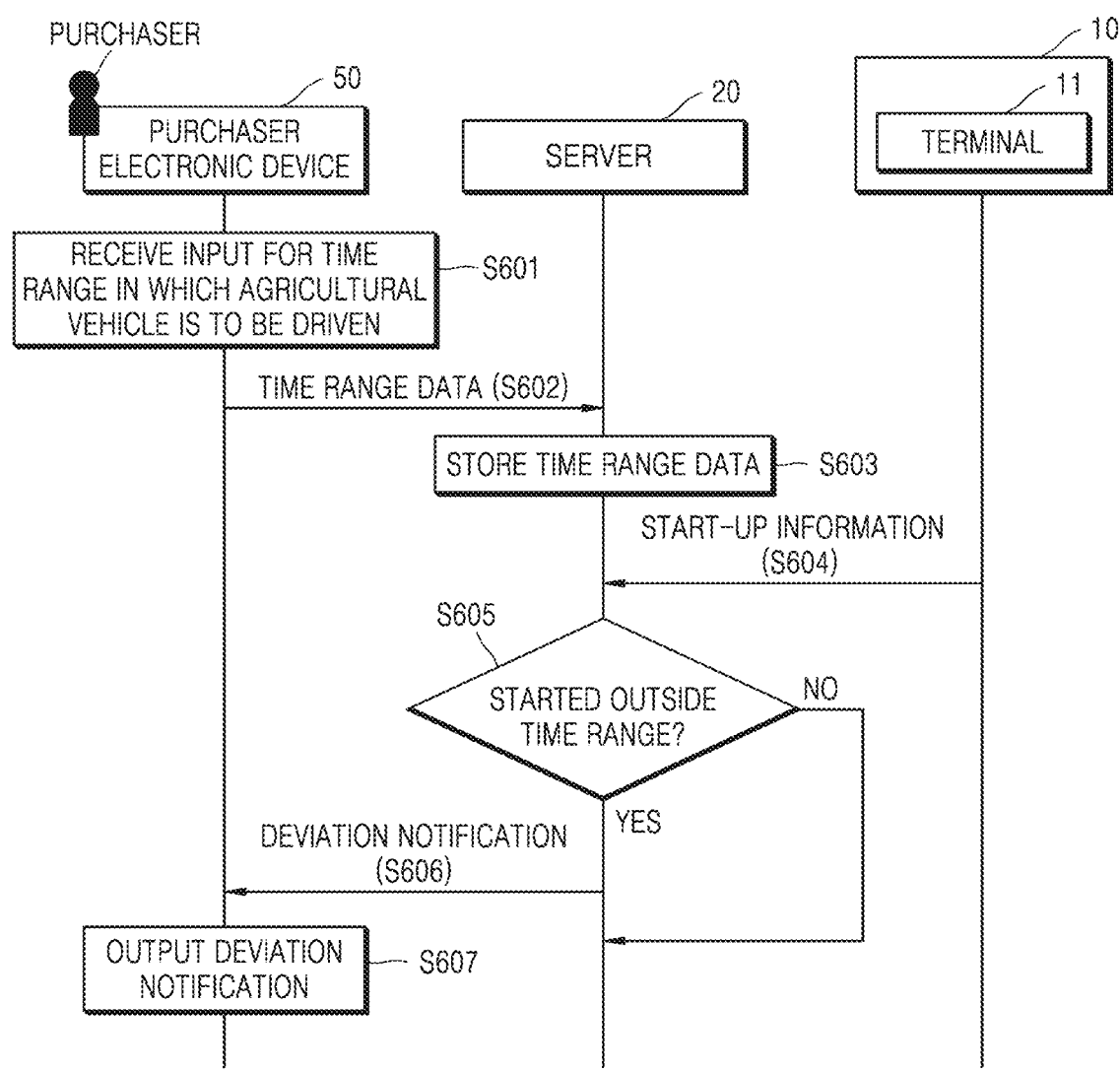
FIG. 14 is a signal flowchart of a system for monitoring driving of the agricultural vehicle, according to an embodiment of the present disclosure.

FIG. 14 is a signal flowchart of a system for monitoring driving of the agricultural vehicle, according to an embodiment of the present disclosure. FIG. 14 may be the signal flowchart when, for example, the agricultural vehicle 10 is driven unmanned, that is, when the purchaser (owner) of the agricultural vehicle 10 is remotely separated from the agricultural vehicle 10.

Referring to FIG. 14, in operation S601, the purchaser electronic device 50 may receive an input for a time range in which the agricultural vehicle 10 is to be driven, from the outside (e.g., from the purchaser). The input may be an input for designating a time range in which the agricultural vehicle 10 is to be driven, that is, a time-fence. The purchaser electronic device 50 may receive the input for the time range on the basis of an input of the purchaser (owner).

In operation S602, the purchaser electronic device 50 may transmit input time range data to the server 20. In operation S603, the server 20 may store time range data for each agricultural vehicle in the memory 23.

According to an embodiment, when one purchaser possesses two or more agricultural vehicles, the purchaser may register the two or more agricultural vehicles in the telematics program, and may designate a time range for each agricultural vehicle. The purchaser may perform an input for designating a first time range of a first agricultural vehicle and an input for designating a second time range of a second agricultural vehicle, through the program. In this case, the server 20 may match and store data of the first agricultural vehicle and data of the first time range, and match and store data of the second agricultural vehicle and data of the second time range.

According to an embodiment of the present disclosure, the server 20 may monitor in real time whether the agricultural vehicle 10 is driven within a time range. This will be described in detail below.

In operation S604, the terminal 11 may transmit start-up information to the server 20 in response to the agricultural vehicle 10 being started.

In operation S605, when the server 20 receives the start-up information from the agricultural vehicle 10, the server 20 may identify whether the agricultural vehicle 10 is started at a time outside a time range designated in relation to the agricultural vehicle 10.

For example, the terminal 11 may transmit the start-up information to the server 20 together with identification information of the terminal 11, and the server 20 may identify the time range data stored in relation to the terminal 11 corresponding to the received identification information and identify whether a current time point is within the time range.

When the agricultural vehicle 10 is started outside the set time range, the server 20 may transmit a deviation notification to the purchaser electronic device 50 (e.g., a smart phone) in operation S606. The deviation notification may be, for example, a push notification. In operation S607, the purchaser electronic device 50 may output the received deviation notification. For example, the purchaser electronic device 50 may display the deviation notification or output notification sound. The deviation notification may indicate that the agricultural vehicle 10 is started outside a set time (i.e., a time-fence).

When the agricultural vehicle 10 is started within the set time range, the server 20 may not transmit a notification.

Meanwhile, in both cases where the agricultural vehicle 10 is started within the set time range and where the agricultural vehicle 10 is started outside the time range, the server 20 may continuously receive the location information of the terminal 11 (or the agricultural vehicle 10) to identify a location of the agricultural vehicle 10 in real time. In addition, the purchaser electronic device 50 may display a map including an icon indicating the location of the agricultural vehicle 10 in the telematics program. Through this, the purchaser may identify in real time where the agricultural vehicle 10 is located.

According to an embodiment, the server 20 may transmit a control signal for turning off the start-up of the vehicle 10 to the terminal 11 in response to the identifying of the agricultural vehicle 10 being located outside the set time range. Accordingly, when the vehicle 10 is outside the set time range, the start-up of the vehicle 10 may be turned off under control of the server 20 and terminal 11.

According to an embodiment, the server 20 may transmit, to the terminal 11, a control signal for sounding a horn or buzzer of the vehicle 10, based on the identifying of the agricultural vehicle 10 being located outside the time range. According to the embodiment, a vehicle driven outside a time range may sound a horn or buzzer.

According to an embodiment, the server 20 may transmit a control signal for turning on emergency lights of the vehicle 10 to the terminal 11, based on the identifying of the agricultural vehicle 10 being located outside the time range. Accordingly, when the vehicle 10 is driven outside the set time range, the emergency lights may be turned on. Through this embodiment, a vehicle that deviates from a time range may be easily found.

A system for monitoring driving of an agricultural vehicle according to an embodiment of the present disclosure described above may include an agricultural vehicle in which a terminal including a processor and a communication module is mounted, a server communicatively connected to the terminal and configured to store a telematics program related to the agricultural vehicle, and a purchaser electronic device configured to execute at least a portion of the telematics program, wherein the purchaser electronic device receives an input for a driving space range of the agricultural vehicle and transmits data of the driving space range to the server, the terminal obtains location information of the agricultural vehicle and transmits the location information to the server, and the server monitors whether the location information is within the driving space range.

According to an embodiment, a display device of the purchaser electronic device may display a map on the basis of the executing of the telematics program, and the input for the driving space range may be an input for selecting a plurality of points on the map.

According to an embodiment, the server may transmit a space deviation notification to the purchaser electronic device in response to identifying of the agricultural vehicle being located outside the driving space range, based on the location information.

According to an embodiment, the server may transmit, to the terminal, a control signal for turning off the start-up of the agricultural vehicle in response to the identifying of the agricultural vehicle being located outside the driving space range on the basis of the location information.

According to an embodiment, when the purchaser electronic device executes the telematics program, the server may transmit, to the purchaser electronic device, screen data of a map including an icon indicating the location of the agricultural vehicle.

According to an embodiment, the purchaser electronic device may receive an input for a time range in which the agricultural vehicle is to be driven and transmit data of the time range to the server, the terminal may transmit start-up information to the server in response to the agricultural vehicle being started, and the server may identify whether the agricultural vehicle is started within the time range.

According to an embodiment, the server may transmit a deviation notification to the purchaser electronic device in response to the identifying of the agricultural vehicle being started outside the time range.

Hereinafter, a system for obtaining information when an agricultural vehicle malfunctions and an operation method thereof, according to an embodiment of the present disclosure, will be described with reference to FIGS. 15 to 17.

Figure 15:
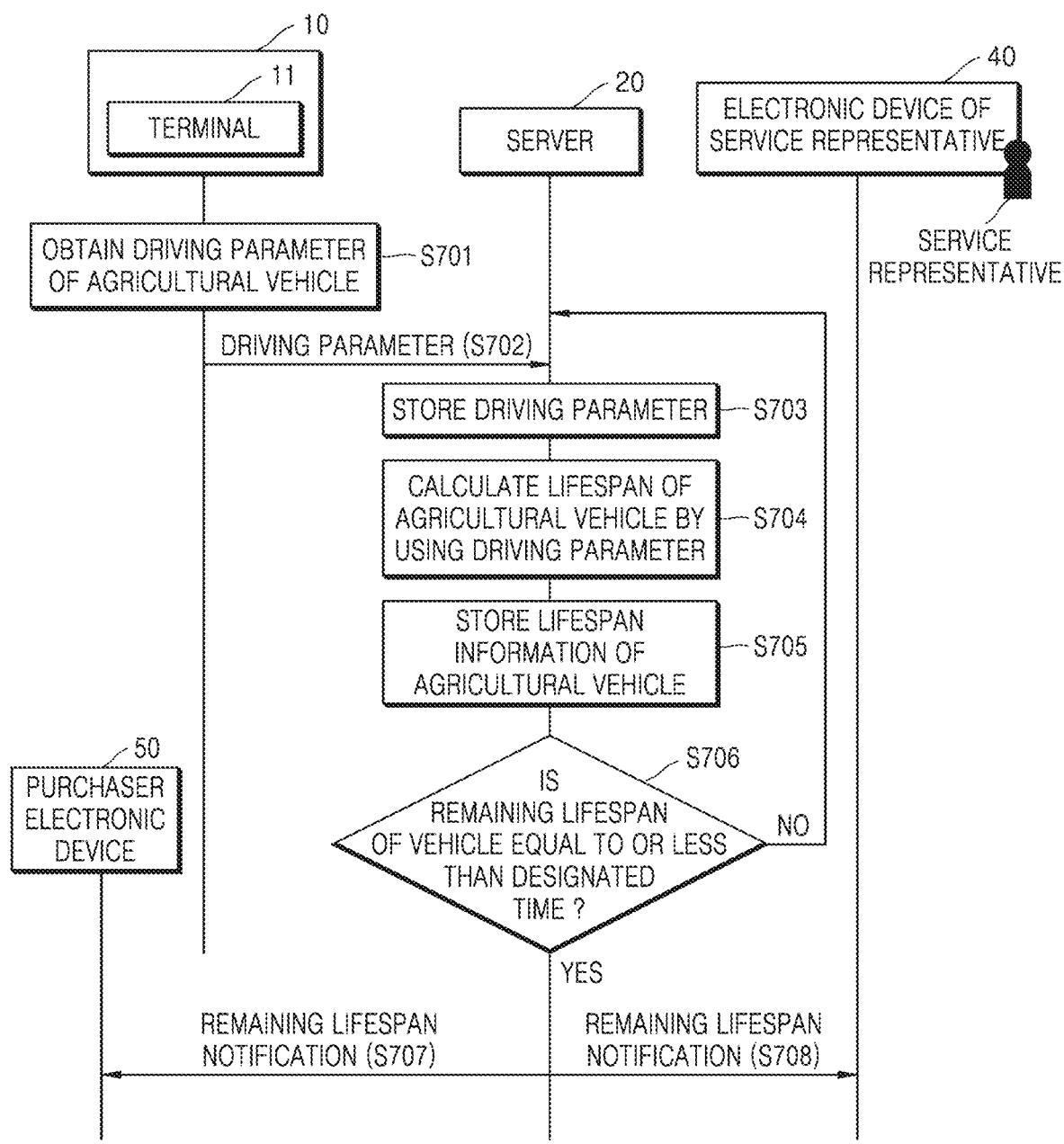
FIG. 15 is a signal flowchart of a system for notifying a lifespan of the agricultural vehicle, according to an embodiment of the present disclosure.

FIG. 15 is a signal flowchart of a system for notifying a lifespan of the agricultural vehicle, according to an embodiment of the present disclosure.

Referring to FIG. 15, in operation S701, the terminal 11 mounted on the agricultural vehicle 10 may obtain a driving parameter of the agricultural vehicle 10. The obtained driving parameter may be used by the server 20 to predict the lifespan of the agricultural vehicle 10.

For example, the driving parameter may include at least one of an engine torque ratio, an engine load rate, engine RPM, an engine operation hour, an accumulated fuel consumption amount, a fuel efficiency (or an instant fuel efficiency), engine malfunction information, an engine oil temperature, an engine room temperature, a coolant temperature, a current gear stage, a mission oil temperature, a driving distance, and a driving time.

In operation S702, the terminal 11 may transmit the obtained driving parameter to the server 20. The terminal 11 may transmit the driving parameter to the server 20 in real time, for example, at certain intervals. The server 20 may receive the driving parameter regarding the agricultural vehicle 10 from the terminal 11 at certain intervals.

In operation S703, the server 20 may store the received driving parameter. For example, the server 20 may match and store identification information of the terminal 11 or the vehicle 10 and the driving parameter.

In operation S704, the server 20 may calculate the lifespan of the agricultural vehicle 10 by using the stored driving parameter. For example, the server 20 may register (store) information about a plurality of terminals 11 (or vehicles 10), and may individually calculate the lifespan or a remaining lifespan of each vehicle 10 in real time by using a driving parameter stored in relation to each terminal 11 (or the vehicle 10).

According to an embodiment, in calculating the lifespan or remaining lifespan of the agricultural vehicle 10, an importance of the engine torque ratio, the engine load rate, the engine RPM, and the engine operation hour among the driving parameters may be higher than that of the remaining driving parameters.

As the agricultural vehicle 10 is driven, the driving parameter of the vehicle 10 continuously changes, and the server 20 may calculate the lifespan or remaining lifespan of the agricultural vehicle 10 in consideration of the driving parameter received from the terminal 11 in real time. Accordingly, even for the agricultural vehicle 10 of a same model, the remaining lifespan may be differently calculated depending on each driving parameter.

According to an embodiment, the server 20 may store a production date of the agricultural vehicle 10 as the information about the agricultural vehicle 10, and the server 20 may calculate the remaining lifespan of the agricultural vehicle 10 in consideration of both the production date of the agricultural vehicle 10 and the driving parameter.

In operation S705, the server 20 may store lifespan information of the agricultural vehicle 10. For example, the server 20 may store the lifespan or remaining lifespan calculated for each agricultural vehicle 10.

In operation S706, the server 20 may identify whether the remaining lifespan of the agricultural vehicle 10 is less than or equal to a designated time.

When the remaining lifespan of the agricultural vehicle 10 is less than or equal to the designated time, the server 20 may transmit a remaining lifespan notification of the vehicle 10 to the purchaser electronic device 50 (operation S707). For example, the remaining lifespan notification transmitted to the purchaser electronic device 50 may be a push notification, but the present disclosure is not limited thereto. In addition, the server 20 may also transmit the remaining lifespan notification of the vehicle 10 to the electronic device 40 of the service representative (operation S708). For example, the service representative may identify the remaining lifespan notification of the agricultural vehicle 10 on the basis of a telematics program being executed in the electronic device 40.

When the remaining lifespan of the agricultural vehicle 10 is longer than the designated time, the server 20 may not transmit the remaining lifespan notification and repeat operations S702 to S706. In other words, the server 20 may continuously receive the driving parameter from the terminal 11 and calculate the remaining lifespan of the agricultural vehicle 10 in real time. The server 20 may continue to calculate and monitor the remaining lifespan of the agricultural vehicle 10 without generating the remaining lifespan notification when the calculated remaining lifespan is longer than the designated time. During this process, the server 20 may replace pre-stored lifespan information with latest calculated lifespan information and store the latest calculated lifespan information.

Through the remaining lifespan notification described above, the purchaser or the service representative may receive a notification when the remaining lifespan of the agricultural vehicle 10 is less than or equal to a designated period of time. Accordingly, the purchaser or the service representative may perform subsequent processes of the agricultural vehicle 10, such as replacement, inspection, and the like. For example, when the service representative identifies the remaining lifespan notification of the agricultural vehicle 10, the service representative may contact the purchaser to notify the purchaser of a need for replacement or inspection and guide the purchaser to replace or inspect the agricultural vehicle 10.

Meanwhile, even when the remaining lifespan of the agricultural vehicle 10 is longer than the designated time, the purchaser or the service representative may execute the program through the purchaser electronic device 50 or the electronic device 40 of the service representative to identify the remaining lifespan of the agricultural vehicle 10. That is, the purchaser electronic device 50 or the electronic device 40 of the service representative may display the remaining lifespan of the agricultural vehicle 10 most recently stored in the server 20, based on a user input for the telematics program.

Figure 16:
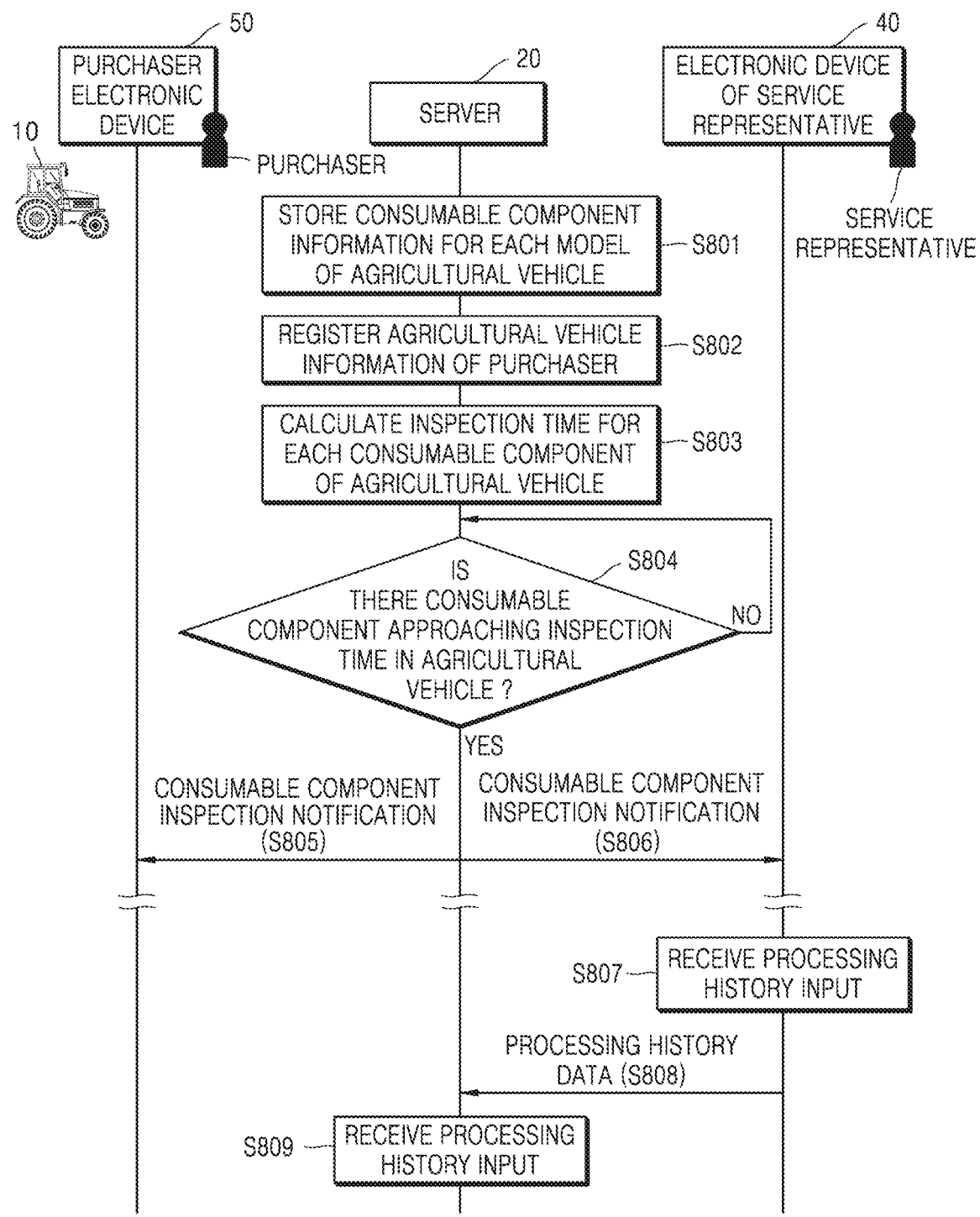
FIG. 16 is a signal flowchart of a system for notifying a lifespan of a consumable component of the agricultural vehicle, according to an embodiment of the present disclosure.

FIG. 16 is a signal flowchart of a system for notifying a lifespan of a consumable component of the agricultural vehicle, according to an embodiment of the present disclosure.

Referring to FIG. 16, in operation S801, the server 20 may store consumable component information for each model of the agricultural vehicle 10.

For example, the agricultural vehicle 10 may include a consumable component to be inspected (or replaced), and consumable components to be inspected may be different for each model of the agricultural vehicle 10. A list of consumable components of the agricultural vehicle 10 of a specific model to be inspected may be pre-stored in the server 20 on the basis of an input of the manager when the model of the agricultural vehicle 10 is released. That is, when the model of the agricultural vehicle 10 is released, the manager may input, to a program, the list of consumable components to be inspected in the model, through the manager electronic device.

Accordingly, the server 20 may store, in advance, the consumable component information for each model of the agricultural vehicle 10.

Thereafter, when the purchaser purchases the specific agricultural vehicle 10, the server 20 may register the information of the agricultural vehicle 10 of the purchaser, based on an input of the seller (or the purchaser) (operation S802). Specifically, the server 20 may store account information of the purchaser and the agricultural vehicle information of the purchaser in association with each other. The server 20 may store model information of the vehicle, a production date of the vehicle (or the consumable component), and the like, as the agricultural vehicle information. In addition, as described above, the server 20 may store the consumable component information according to the model of the agricultural vehicle 10.

In operation S803, the server 20 may calculate an inspection time for each consumable component of the agricultural vehicle 10. For example, the server 20 may calculate the inspection time for each consumable component of the agricultural vehicle 10 in consideration of the consumable component information for each model of the agricultural vehicle 10, the production date of the agricultural vehicle 10 (or the consumable component), and the like.

In operation S804, the server 20 may identify whether there is a consumable component approaching the inspection time in the agricultural vehicle 10. The inspection time being approached may mean that a designated inspection time is within a certain date.

According to an embodiment, the server 20 may transmit a consumable component inspection notification to the purchaser electronic device 50, based on identifying that there is a consumable component approaching the inspection time in the agricultural vehicle 10 (operation S805). The consumable component inspection notification may be, for example, a push notification, or may be displayed on the basis of the purchaser accessing the telematics program through the electronic device 50.

The server 20 may transmit the consumable component inspection notification to the electronic device 40 of the service representative, based on the identifying that there is a consumable component approaching the inspection time in the agricultural vehicle 10 (operation S806). According to an embodiment, the service representative may identify the consumable component inspection notification of the agricultural vehicle 10, based on the access to the telematics program through the electronic device 40.

Meanwhile, the service representative may guide the purchaser to inspect or replace the consumable component, based on the identifying of the consumable component inspection notification.

After inspecting or replacing the consumable component, the service representative may input a processing history through the electronic device 40. The electronic device 40 of the service representative may receive a processing history input regarding the replacement or inspection, based on the input of the service representative (operation S807).

In operation S808, the electronic device 40 of the service representative may transmit processing history data to the server 20, based on the receiving of the processing history input. The server 20 may receive the processing history data regarding the replacement or inspection of the agricultural vehicle 10.

In operation S809, the server 20 may store the processing history data regarding the replacement or inspection of the agricultural vehicle 10.

Accordingly, the purchaser or the service representative may identify a replacement or inspection history of the consumable component of the agricultural vehicle 10 through the telematics program.

Figure 17:
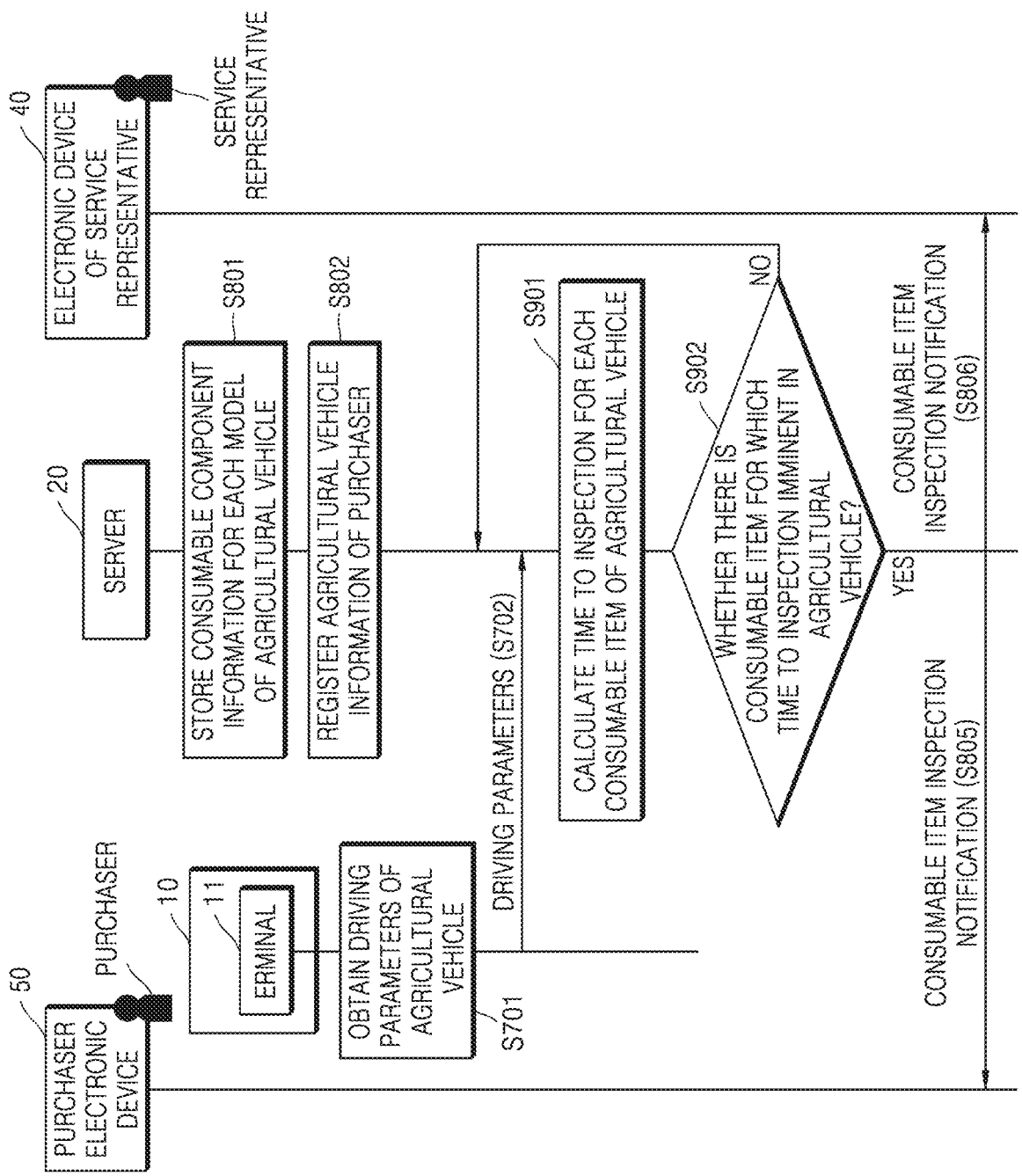
FIG. 17 is a signal flowchart of a system for notifying a lifespan of a consumable component of the agricultural vehicle, according to another embodiment of the present disclosure.

FIG. 17 is a signal flowchart of a system for notifying a lifespan of a consumable component of the agricultural vehicle, according to another embodiment of the present disclosure. Operations S801, S802, S701, and S702 correspond to the above description of operations of the same reference numerals, and thus will be briefly described.

Referring to FIG. 17, in operation S801, the server 20 may store consumable component information for each model of the agricultural vehicle 10.

The list of consumable components of the agricultural vehicle 10 of the specific model to be inspected may be stored, in advance, in the server 20 on the basis of an input of the manager when the model of the agricultural vehicle 10 is released. That is, when the model of the agricultural vehicle 10 is released, the manager may input, to the program, the list of consumable components to be inspected in the model, through the manager electronic device.

Accordingly, the server 20 may store, in advance, consumable component information for each model of the agricultural vehicle 10.

Thereafter, when the purchaser purchases the specific agricultural vehicle 10, the server 20 may register the information of the agricultural vehicle 10 of the purchaser, based on an input of the seller (or the purchaser) (operation S802). Specifically, the server 20 may store account information of the purchaser and the agricultural vehicle information of the purchaser in association with each other. The server 20 may store the model information of the vehicle, a production date of the vehicle (or a consumable component), and the like, as the agricultural vehicle information. In addition, as described above, the server 20 may also store the consumable component information according to the model of the agricultural vehicle 10.

Meanwhile, the terminal 11 mounted on the agricultural vehicle 10 may obtain the driving parameter of the agricultural vehicle 10, in operation S701. The obtained driving parameter may be used by the server 20 to calculate the inspection time for each consumable component of the agricultural vehicle 10.

For example, the driving parameter may include at least one of an engine torque ratio, an engine load rate, engine RPM, an engine operation hour, an accumulated fuel consumption amount, a fuel efficiency (or an instant fuel efficiency), engine malfunction information, an engine oil temperature, an engine room temperature, a coolant temperature, a current gear stage, a mission oil temperature, a driving distance, and a driving time.

In operation S702, the terminal 11 may transmit the obtained driving parameter to the server 20. The terminal 11 may transmit the driving parameter to the server 20 in real time, for example, at certain intervals. The server 20 may receive the driving parameter regarding the agricultural vehicle 10 from the terminal 11 at certain intervals.

In operation S901, the server 20 may calculate the inspection time for each consumable component of the agricultural vehicle 10 by using the driving parameter. For example, the server 20 may calculate the inspection time for each consumable component of the agricultural vehicle 10 in consideration of the consumable component information for each model of the agricultural vehicle 10, the production date of the agricultural vehicle 10 (or the consumable component), the driving parameter, and the like.

For example, the server 20 may individually calculate the inspection time for each consumable component in real time, by using the driving parameter.

As the agricultural vehicle 10 is driven, the driving parameter of the agricultural vehicle 10 continuously changes, and the server 20 may calculate the inspection time of the consumable component in consideration of the driving parameter received from the terminal 11 periodically. Accordingly, even for a same consumable component, when mounted on different agricultural vehicles, inspection times may be differently calculated according to driving parameters of the respective agricultural vehicles.

In addition, upon periodically receiving the driving parameter, the server 20 may periodically calculate the inspection time for each consumable component. Accordingly, the inspection time of each consumable component may be periodically updated.

In operation S902, the server 20 may monitor whether there is a consumable component approaching the inspection time in the agricultural vehicle 10. The inspection time being approached may mean that the inspection time is within a certain date.

According to an embodiment, the server 20 may transmit the consumable component inspection notification to the purchaser electronic device 50, based on identifying that there is a consumable component approaching the inspection time in the agricultural vehicle 10 (operation S805). The consumable component inspection notification may be, for example, a push notification, or may be displayed on the basis of the purchaser accessing the telematics program through the electronic device 50.

The server 20 may transmit the consumable component inspection notification to the electronic device 40 of the service representative, based on the identifying that there is a consumable component approaching the inspection time in the agricultural vehicle 10 (operation S806). According to an embodiment, the service representative may identify the consumable component inspection notification of the agricultural vehicle 10, based on the access to the telematics program through the electronic device 40.

Meanwhile, the service representative may guide the purchaser to inspect or replace the consumable component, based on the identifying of the consumable component inspection notification.

After inspecting or replacing the consumable component, the service representative may input a processing history through the electronic device 40. The server 20 may store processing history data regarding the replacement or inspection, based on an input of the service representative. Accordingly, the purchaser or the service representative may identify the replacement or inspection history of the consumable component of the agricultural vehicle 10 through the telematics program.

The system for notifying a lifespan of an agricultural vehicle or a component thereof, according to an embodiment of the present disclosure described above, includes an agricultural vehicle in which a terminal including a processor and a communication module is mounted, a server that is communicatively connected to the terminal and stores a telematics program related to the agricultural vehicle, and a purchaser electronic device that executes at least a portion of the telematics program, wherein the terminal may obtain a driving parameter regarding the agricultural vehicle and transmit the driving parameter to the server, and the server may calculate a remaining lifespan of the agricultural vehicle by using the driving parameter and transmit a remaining lifespan notification to the purchaser electronic device, based on the remaining lifespan being less than or equal to a designated time.

According to an embodiment, the driving parameter may include at least one of an engine torque ratio, an engine load rate, engine RPM, an engine operation hour, an accumulated fuel consumption amount, a fuel efficiency, engine malfunction information, an engine oil temperature, an engine room temperature, a coolant temperature, a current gear stage, a mission oil temperature, a driving distance, and a driving time of the agricultural vehicle.

According to an embodiment, in calculating the remaining lifespan of the agricultural vehicle, an importance of the engine torque ratio, the engine load rate, the engine RPM, and the engine operation hour among the driving parameters may be higher than that of the remaining driving parameters.

According to an embodiment, the terminal may obtain the driving parameter at certain intervals and transmit the driving parameter to the server in real time, and the server may periodically calculate and store lifespan information of the agricultural vehicle by using the driving parameter and replace pre-stored lifespan information with latest calculated lifespan information and store the latest calculated lifespan information.

According to an embodiment, the system may further include a service representative electronic device in which at least a portion of the telematics program is executed, and the server may further transmit a remaining lifespan notification to the service representative electronic device, based on the remaining lifespan being less than or equal to the designated time.

According to an embodiment, the server may store information about a consumable component to be inspected for each model of the agricultural vehicle and calculate an inspection time for each consumable component of the agricultural vehicle by using the driving parameter received from the terminal.

According to an embodiment, even for a same consumable component, when mounted on different agricultural vehicles, inspection times may be differently calculated according to driving parameters of the respective agricultural vehicles.

Hereinafter, a system for obtaining information when an agricultural vehicle malfunctions and an operation method thereof, according to an embodiment of the present disclosure, will be described with reference to FIGS. 18 to 21.

Figure 18:
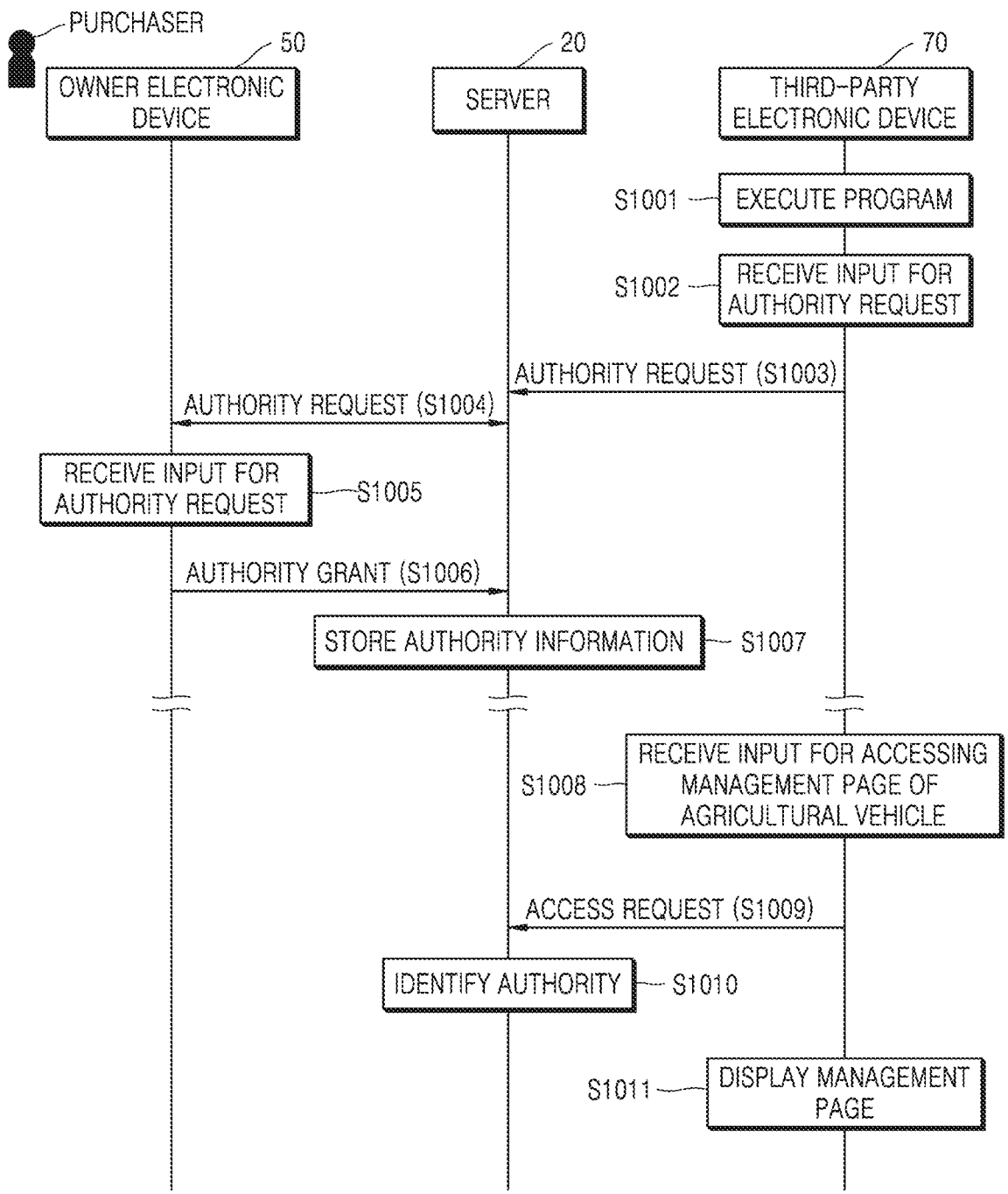
FIG. 18 is a signal flowchart of a system for sharing authority to use the agricultural vehicle, according to an embodiment of the present disclosure.

FIG. 18 is a signal flowchart of a system for sharing authority to use the agricultural vehicle, according to an embodiment of the present disclosure. Since the above-described purchaser is an owner of the agricultural vehicle 10, hereinafter, the purchaser electronic device 50 is also referred to as an owner electronic device 50.

Referring to FIG. 18, the system for sharing authority to use the agricultural vehicle 10, according to an embodiment of the present disclosure, may include the owner (purchaser) electronic device 50 of the owner (purchaser) of the agricultural vehicle 10, the server 20 configured to execute a telematics program, and a third party electronic device 70 of a third party to whom authority for the agricultural vehicle 10 is to be granted.

According to an embodiment of the present disclosure, the agricultural vehicle 10 and the owner of the agricultural vehicle 10 may be matched one-to-one. The owner may have authority to use the agricultural vehicle 10. For example, the owner may execute the telematics program through the owner electronic device 50 to access information about the agricultural vehicle 10, and use the agricultural vehicle 10 through the telematics program, such as remotely starting the agricultural vehicle 10.

The owner may grant the authority to use the agricultural vehicle 10 to the third party through the telematics program. The third party (an authorized person) who is granted the authority to use the agricultural vehicle 10 may access the information about the agricultural vehicle 10 through the third party electronic device 70, and use the agricultural vehicle 10 through the telematics program, for example, remotely start the agricultural vehicle 10.

Hereinafter, an operation of the system when the owner of the agricultural vehicle 10 grants the authority to use the agricultural vehicle 10 to the third party will be described in detail.

First, the third party may execute the telematics program in the third party electronic device 70 to request an authority for the agricultural vehicle 10, through the telematics program. In other words, the third party electronic device 70 may execute the telematics program, based on a user input of the third party (operation S1001).

In operation S1002, the third party electronic device 70 may receive, from the outside (the third party), the input requesting the authority to use the agricultural vehicle 10. The third party electronic device 70 may transmit an authority request signal to the server 20 (operation S1003).

In operation S1004, the server 20 may transmit the authority request signal to the owner electronic device 50. The owner electronic device 50 may receive an input for granting authority, from the outside (the owner) (operation S1005). When the input for authority grant is received, the owner electronic device 50 may transmit an authority grant signal to the server 20 (operation S1006). In other words, the owner electronic device 50 may respond to the authority grant through the program executed in the server 20.

When the authority grant response is received from the owner electronic device 50, the server 20 may store authority information of a third party account (operation S1007). In other words, the server 20 may register authority of the third party account to use the agricultural vehicle 10.

Thereafter, in operation S1008, the third party electronic device 70 may receive an input for accessing a management page of the agricultural vehicle through the third party account in the telematics program.

In response to the input, the third party electronic device 70 may transmit an access request signal requesting access to the third party account to the server 20 (operation S1009). The server 20 may receive the access request signal for the management page of the agricultural vehicle 10 from the third party electronic device 70.

In operation S1010, the server 20 may identify whether the third party account has authority to access the management page of the agricultural vehicle 10. When the server 20 identifies the authority of the third party account, the management page for the agricultural vehicle 10 may be displayed on the third party electronic device 70 (operation S1011).

For example, the server 20 may store authority information of each account in a form of a table or link, and identify whether a specific account has authority for a specific agricultural vehicle, based on the table or link. The server 20 may allow the third party account to move to the management page of the agricultural vehicle 10, based on the identifying that the third party account has the authority for the agricultural vehicle 10. For example, the server 20 may issue an authentication token value to the third party electronic device 70, based on the authority identification. However, the present disclosure is not limited thereto. Of course, when the server 20 identifies that the third party account has no authority, the server 20 may not issue the authentication token value and may prevent the third party account from moving to the management page.

Figure 19:
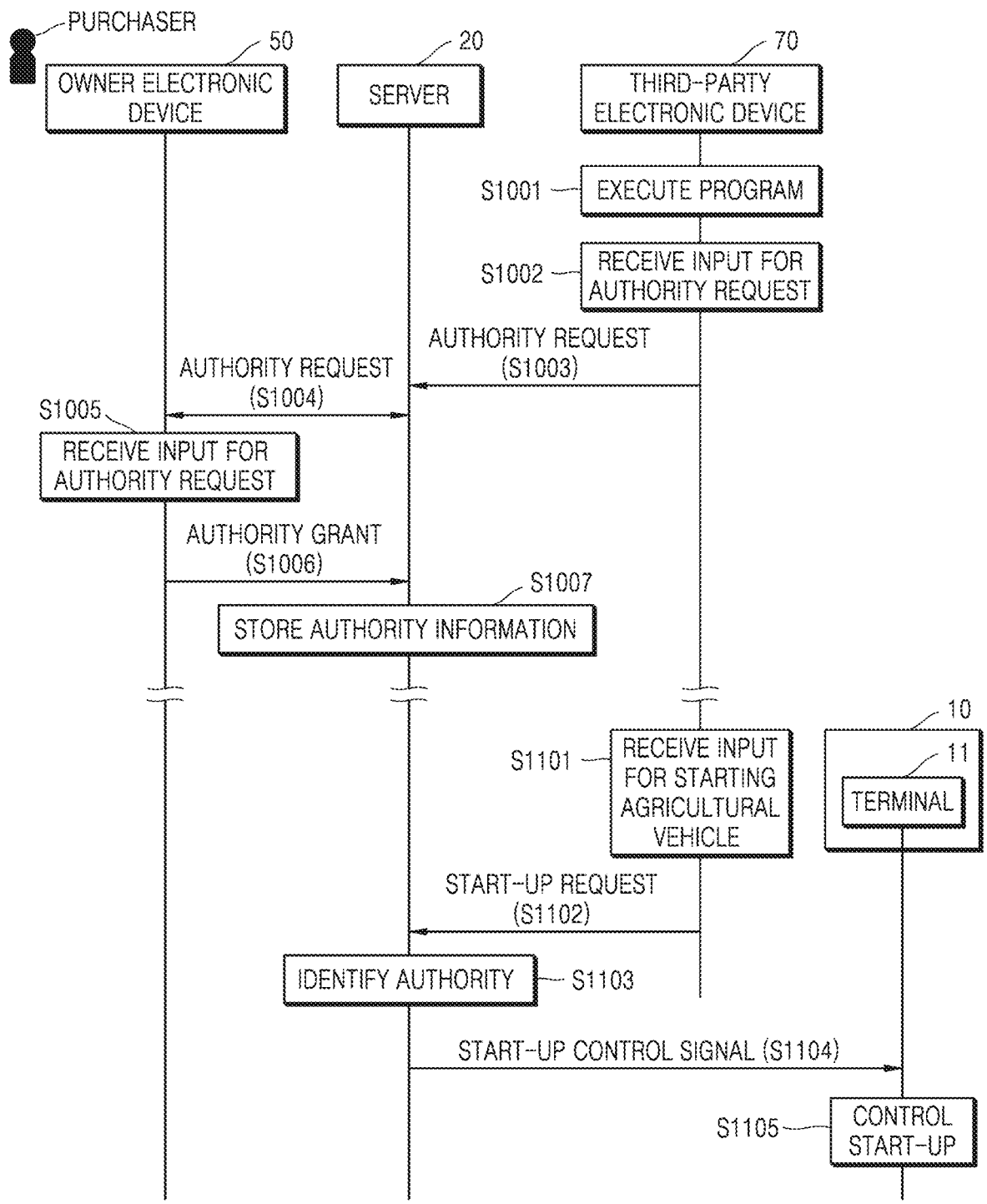
FIG. 19 is a signal flowchart of a system for sharing authority to use the agricultural vehicle, according to another embodiment of the present disclosure.

FIG. 19 is a signal flowchart of a system for sharing authority to use the agricultural vehicle, according to another embodiment of the present disclosure. In FIG. 19, operations S1001 to S1007 correspond to the above-described operations.

First, the third party may execute the telematics program in the third party electronic device 70 to request an authority for the agricultural vehicle 10, through the telematics program. In other words, the third party electronic device 70 may execute the telematics program, based on a user input of the third party (operation S1001).

In operation S1002, the third party electronic device 70 may receive, from the outside (the third party), the input requesting the authority to use the agricultural vehicle 10. The third party electronic device 70 may transmit an authority request signal to the server 20 (operation S1003).

In operation S1004, the server 20 may transmit the authority request signal to the owner electronic device 50. The owner electronic device 50 may receive an input for granting authority, from the outside (the owner) (operation S1005). When the input for authority grant is received, the owner electronic device 50 may transmit an authority grant signal to the server 20 (operation S1006).

When the authority grant response is received from the owner electronic device 50, the server 20 may store authority information of a third party account (operation S1007).

Thereafter, in operation S1101, the third party electronic device 70 may receive an input for starting the agricultural vehicle 10 through the third party account in the telematics program.

In response to the input, the third party electronic device 70 may transmit a start-up request signal of the third party electronic device 70 (of the third party account) to the server 20 (operation S1102).

In operation S1103, the server 20 may identify whether the third party account has the authority to use the agricultural vehicle 10. When the authority for the agricultural vehicle 10 of the third party account is identified, the server 20 may transmit a start-up control signal to the terminal 11 corresponding to the agricultural vehicle 10 (operation S1104). The terminal 11 may control the agricultural vehicle 10 to start in response to the receiving of the start-up control signal (operation S1105).

Figure 20:
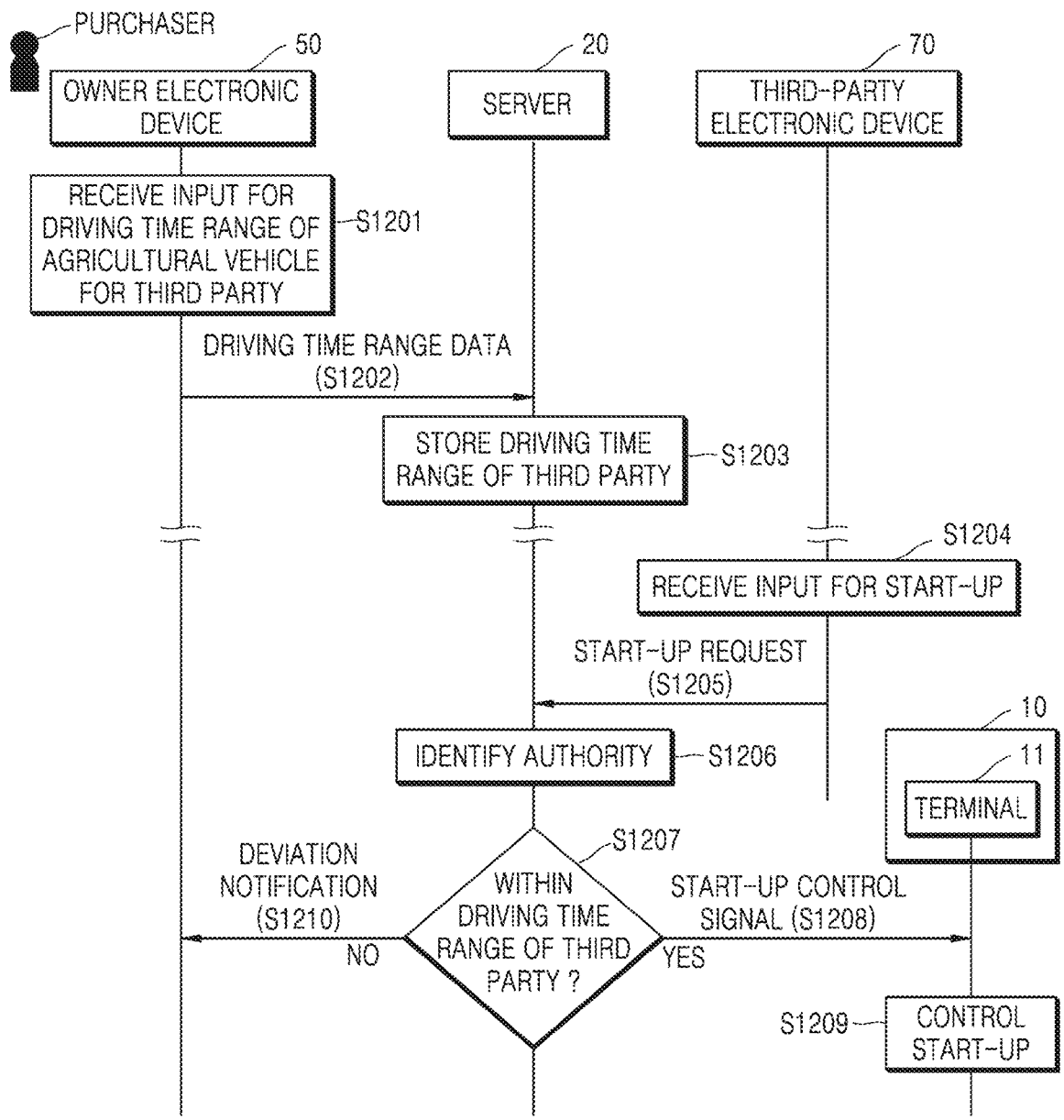
FIG. 20 is a signal flowchart of a system for setting a range of authority for the agricultural vehicle, according to an embodiment of the present disclosure.

FIG. 20 is a signal flowchart of a system for setting a range of authority for the agricultural vehicle, according to an embodiment of the present disclosure.

According to an embodiment of the present disclosure, an owner may temporally and/or spatially limit the authority of the third party (the authorized person) to use the agricultural vehicle 10.

Specifically, the server 20 may receive a signal for limiting a driving time range and a driving space range of the third party from the owner electronic device 50 (from an owner account), and set a driving time range and a driving space range of the agricultural vehicle 10.

In operation S1201, the owner electronic device 50 may receive an input for the driving time range of the third party from the outside (from the purchaser). The input may be an input for designating a time range in which the third party is able to drive the agricultural vehicle 10, that is, a time-fence. The owner electronic device 50 may receive the input for the driving time range of the third party, based on an input of the purchaser (owner).

In operation S1202, the owner electronic device 50 may transmit input driving time range data to the server 20. In operation S1203, the server 20 may store the driving time range of the third party in the memory 23.

According to an embodiment, two or more authorized persons (third parties) may be registered for one agricultural vehicle, and the owner may designate the driving time range for each of the authorized persons. The owner may perform an input for designating a first driving time range of a first authorized person vehicle and an input for designating a second driving time range of a second authorized person, through the program. In this case, the server 20 may match and store account information of the first authorized person and data of the first driving time range, and match and store account information of the second authorized person and data of the second driving time range.

According to an embodiment of the present disclosure, the server 20 may restrict the agricultural vehicle 10 to be driven only within the driving time range through the third party account. This will be described in detail below.

In operation S1204, the third party electronic device 70 may receive a start-up input for the agricultural vehicle 10 through the third party account. In operation S1205, the third party electronic device 70 may transmit a start-up request signal to the server 20 together with third party account information. The server 20 may receive the start-up request signal together with the third party account information.

In operation S1206, the server 20 may identify whether the third party account has an authority for the agricultural vehicle 10, based on the reception.

When it is identified that the third party account has the authority to use the agricultural vehicle 10, the server 20 may identify whether a current time is within a driving time range of the third party (operation S1207).

When the current time is within the driving time range of the third party, the server 20 may transmit a start-up control signal to the terminal 11 (operation S1208). Upon receiving the start-up control signal, the terminal 11 may control the agricultural vehicle 10 to start (operation S1209).

Meanwhile, when the current time is outside the driving time range of the third party, the server 20 may not transmit the start-up control signal to the terminal 11 and may transmit a driving deviation notification of the third party to the owner electronic device 50 (operation S1210). The driving deviation notification may be, for example, a push notification.

Accordingly, the agricultural vehicle 10 may be driven only within the set driving time range through the third party account.

Although not shown in the drawing, the server 20 may transmit a control signal for turning off the start-up of the agricultural vehicle 10 to the terminal 11 when a driving time of the third party account is terminated.

Figure 21:
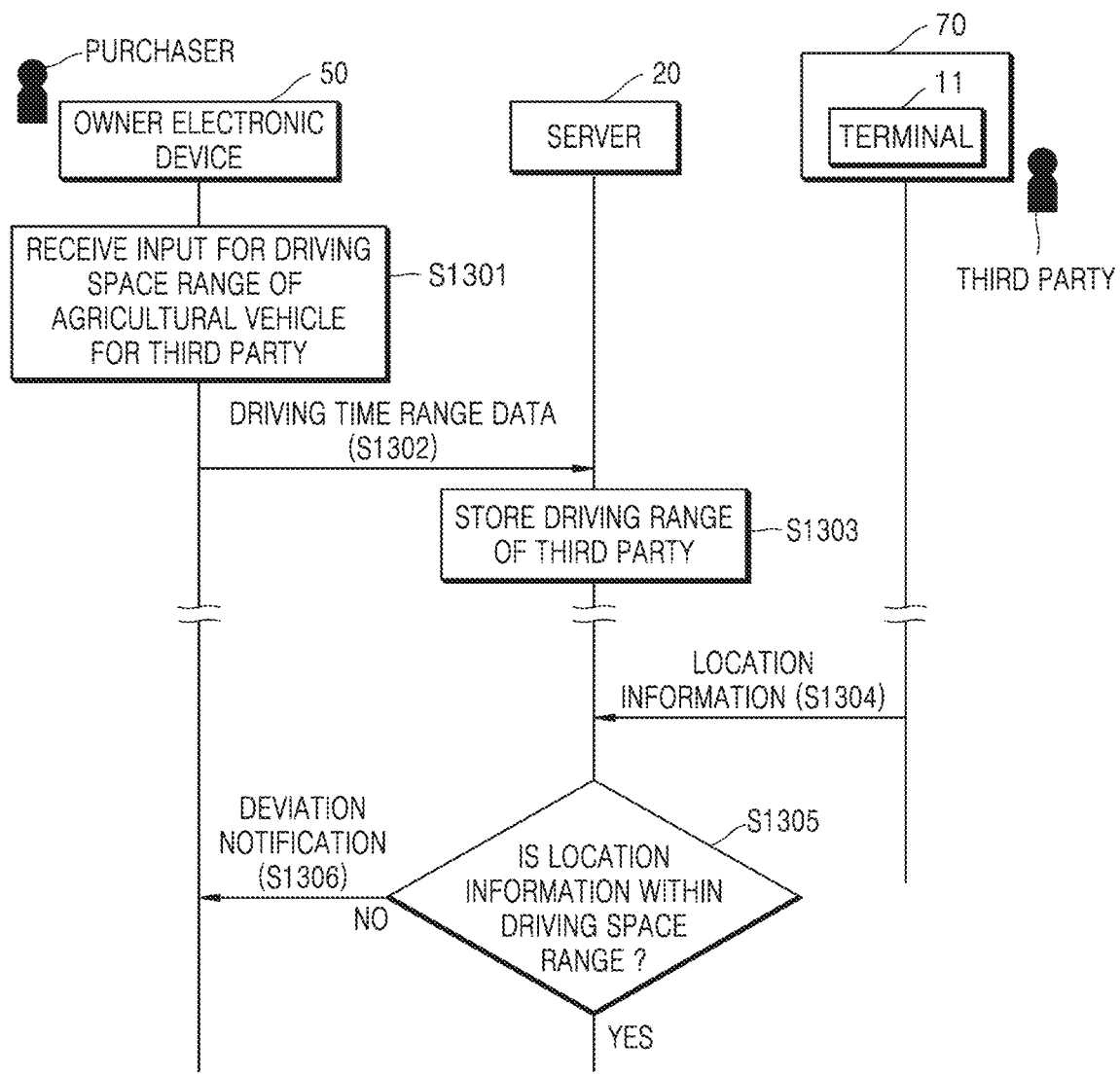
FIG. 21 is a signal flowchart of a system for setting a range of authority for the agricultural vehicle, according to another embodiment of the present disclosure.

FIG. 21 is a signal flowchart of a system for setting a range of authority for the agricultural vehicle, according to another embodiment of the present disclosure.

In operation S1301, the owner electronic device 50 may receive an input for a driving space range of the agricultural vehicle 10 for a third party, from the outside (from a purchaser). The input may be an input for designating a space range in which the third party is able to drive the agricultural vehicle 10, that is, a geo-fence. The owner electronic device 50 may receive the input for the driving space range of the agricultural vehicle 10 for the third party, based on an input of the purchaser (owner).

In operation S1302, the owner electronic device 50 may transmit input driving space range data to the server 20. In operation S1303, the server 20 may store the driving space range of the third party in the memory 23.

According to an embodiment, two or more authorized persons (third parties) may be registered for one agricultural vehicle, and the owner may designate the driving space range for each of the authorized persons. The owner may perform an input for designating a first driving space range of a first authorized person vehicle and an input for designating a second driving space range of a second authorized person, through the program. In this case, the server 20 may match and store account information of the first authorized person and data of the first driving space range, and match and store account information of the second authorized person and data of the second driving space range.

According to an embodiment of the present disclosure, the server 20 may restrict the agricultural vehicle 10 to be driven only within the driving space range through a third party account. This will be described in detail below. For example, the server 20 may identify that the agricultural vehicle 10 is driven through the third party account, based on start-up information received through the third party account.

In operation S1304, the server 20 may continuously receive location information of the agricultural vehicle 10 from the terminal 11 while the agricultural vehicle 10 is driven through the third party account.

In operation S1305, the server 20 may monitor whether a location of the agricultural vehicle 10 is within the driving space range designated to the third party, based on the received location information. Based on identifying that the location of the agricultural vehicle 10 is outside the driving space range designated to the third party, the server 20 may transmit a deviation notification to the owner electronic device 50 (operation S1306). As another example, the server 20 may transmit a control signal for turning off the start-up of the agricultural vehicle 10 to the terminal 11, based on the identifying that the location of the agricultural vehicle 10 is outside the driving space range designated to the third party.

Accordingly, the agricultural vehicle 10 may be driven only within the set driving space range through the third party account.

Meanwhile, according to an embodiment of the present disclosure, the authority is unable to grant authority to use the agricultural vehicle 10 to another third party.

According to various embodiments of the present disclosure, the owner of the agricultural vehicle 10 may increase incomes through a sharing economy using the agricultural vehicle 10.

The system for sharing authority to use an agricultural vehicle, according to an embodiment of the present disclosure described above, includes an agricultural vehicle in which a terminal including a processor and a communication module is mounted, a server that is communicatively connected to the terminal and stores a telematics program related to the agricultural vehicle, an owner electronic device of an owner of the agricultural vehicle, and a third party electronic device of a third party to whom authority to use the agricultural vehicle is granted, wherein the owner electronic device and the third party electronic device may execute at least a portion of the telematics program, the owner electronic device may receive an input for granting an authority of a third party account to use the agricultural vehicle, through the telematics program, and transmit a signal of the grant to the server, and the server may store authority information of the third party account to use the agricultural vehicle and transmit screen data regarding a management page of the agricultural vehicle to the third party electronic device in response to a request of the third party account to access the management page of the agricultural vehicle.

According to an embodiment, the server may identify whether the third party account has an authority to use the agricultural vehicle in response to receiving of a start-up request of the agricultural vehicle from the third party electronic device through the third party account, and transmit a start-up control signal to the terminal in response to identifying that the third party account has the authority to use the agricultural vehicle.

According to an embodiment, the server may receive data about a driving time range of the third party account, through an owner account, store the driving time range of the third party account, and identify whether a current time is within the driving time range of the third party account, based on receiving of the start-up request of the agricultural vehicle from the third party electronic device through the third party account.

According to an embodiment, the server may transmit a driving deviation notification of the third party to the owner electronic device in response to the identifying that the current time is outside the driving time range.

According to an embodiment, the server may receive data about a driving time range of the third party account through the owner account, store the driving time range of the third party account, and transmit a control signal for turning off the start-up of the agricultural vehicle to the terminal, based on a driving time of the third party account being terminated.

According to an embodiment, the server may receive data about a driving space range of the third party account through the owner account, store the driving space range of the third party account, receive location information of the agricultural vehicle, and monitor whether a location of the agricultural vehicle is within the driving space range while the agricultural vehicle is driven through the third party account, based on the location information.

According to an embodiment, the server may transmit the driving deviation notification of the third party to the owner electronic device in response to identifying that the location of the agricultural vehicle is outside the driving space range while the agricultural vehicle is driven through the third party account.

According to an embodiment, the server may transmit the control signal for turning off the start-up of the agricultural vehicle to the terminal in response to identifying that the location of the agricultural vehicle is outside the driving space range while the agricultural vehicle is driven through the third party account.

The present disclosure has been described with reference to the examples illustrated in the drawings, but these are only examples, and it will be appreciated by those of ordinary skill in the art that various modifications and variations of the embodiments are possible therefrom. Accordingly, the true technical protection scope of the present disclosure should be determined by the technical spirit of the appended claims.

The invention claimed is:

1. A system for obtaining information when an agricultural vehicle malfunctions, the system comprising:
    an agricultural vehicle in which a terminal including a processor and a communication module is mounted; and
    a server communicatively connected to the terminal,
    wherein the processor of the terminal is configured to:
        when a malfunction of the agricultural vehicle is detected through a sensor included in the agricultural vehicle, generate a malfunction code and transmits the malfunction code to the server;
        when the malfunction code corresponds to an accident or critical malfunction, operate in a mode in which the processor transmits, to the server through the communication module, raw data during a certain first period of time before a time point at which the malfunction code is generated and raw data during a certain second period of time after the time point at which the malfunction code is generated, without sampling; and
        while no malfunction of the agricultural vehicle is detected through the sensor, sample raw data obtained in real time and transmit the sampled raw data to the server,
    wherein the mode is a mode in which the raw data during the certain first period of time and the raw data during the certain second period of time are transmitted to the server, and
    wherein the server is configured to transmit a malfunction notification corresponding to the malfunction code to an electronic device of a service representative of the agricultural vehicle.

2. The system of claim 1, wherein
    the server, in response to receiving the malfunction code, is configured to transmit location information of the agricultural vehicle to at least one of the electronic device of the service representative of the agricultural vehicle, an electronic device of a purchaser of the agricultural vehicle, and an emergency contact electronic device.

3. The system of claim 1, wherein the processor of the terminal is configured to control a sound device of the agricultural vehicle to output sound, when the malfunction of the agricultural vehicle is detected through the sensor.

4. An operation method of a terminal mounted on an agricultural vehicle, the operation method comprising:
- generating a malfunction code in response to a malfunction being detected through a sensor included in the agricultural vehicle; and
- when the generated malfunction code corresponds to an accident or critical malfunction, operating in a mode in which raw data during a certain first period of time before a time point at which the malfunction code is generated and raw data during a certain second period of time after the time point at which the malfunction code is generated are transmitted to a server through a communication module included in the agricultural vehicle, without sampling,
- wherein the mode is a mode in which the raw data during the certain first period of time and the raw data during the certain second period of time are transmitted to the server.

* * * * *